United States Patent
Choi et al.

(10) Patent No.: US 12,481,405 B2
(45) Date of Patent: Nov. 25, 2025

(54) ELECTRONIC DEVICE

(71) Applicant: SAMSUNG DISPLAY CO., LTD., Yongin-si (KR)

(72) Inventors: Wonjun Choi, Yongin-si (KR); Kicheol Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 12 days.

(21) Appl. No.: 18/360,109

(22) Filed: Jul. 27, 2023

(65) Prior Publication Data

US 2024/0118777 A1  Apr. 11, 2024

(30) Foreign Application Priority Data

Oct. 6, 2022 (KR) .......... 10-2022-0128106
Dec. 14, 2022 (KR) .......... 10-2022-0174464

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05)

(58) Field of Classification Search
CPC ............ G06F 3/0446; G06F 3/04164
See application file for complete search history.

(56) References Cited

U.S. PATENT DOCUMENTS

| | | | |
|---|---|---|---|
| 9,870,111 B2 | 1/2018 | Sugita et al. | |
| 10,620,732 B2* | 4/2020 | Oh | G06F 3/0412 |
| 10,942,612 B2 | 3/2021 | Kim et al. | |
| 11,354,001 B2* | 6/2022 | Choi | G06F 3/0448 |
| 11,385,751 B2 | 7/2022 | Bang et al. | |
| 11,449,164 B1* | 9/2022 | Jeong | G06F 3/0412 |
| 11,861,126 B2* | 1/2024 | Bok | G06F 3/0448 |
| 2020/0110498 A1* | 4/2020 | Lee | H10K 59/87 |
| 2022/0221951 A1* | 7/2022 | Ge | G06F 3/044 |
| 2022/0285657 A1* | 9/2022 | Hong | H10K 77/111 |

FOREIGN PATENT DOCUMENTS

| KR | 10-2018-0025389 | 3/2018 |
|---|---|---|
| KR | 10-2419557 | 7/2022 |

* cited by examiner

*Primary Examiner* — Doon Y Chow
(74) *Attorney, Agent, or Firm* — F. CHAU & ASSOCIATES, LLC

(57) ABSTRACT

Disclosed is an electronic device including a sensor in which a sensing area and a peripheral area adjacent to the sensing area are defined. The sensor includes a plurality of first sensing electrodes arranged in a first direction, a plurality of second sensing electrodes arranged in a second direction intersecting the first direction, a plurality of first trace lines electrically connected to the plurality of first sensing electrodes, respectively, and a plurality of second trace lines electrically connected to the plurality of second sensing electrodes, respectively. Each of the plurality of second trace lines includes a plurality of sub-lines overlapping the sensing area and the plurality of sub-lines are spaced apart from one another.

18 Claims, 14 Drawing Sheets

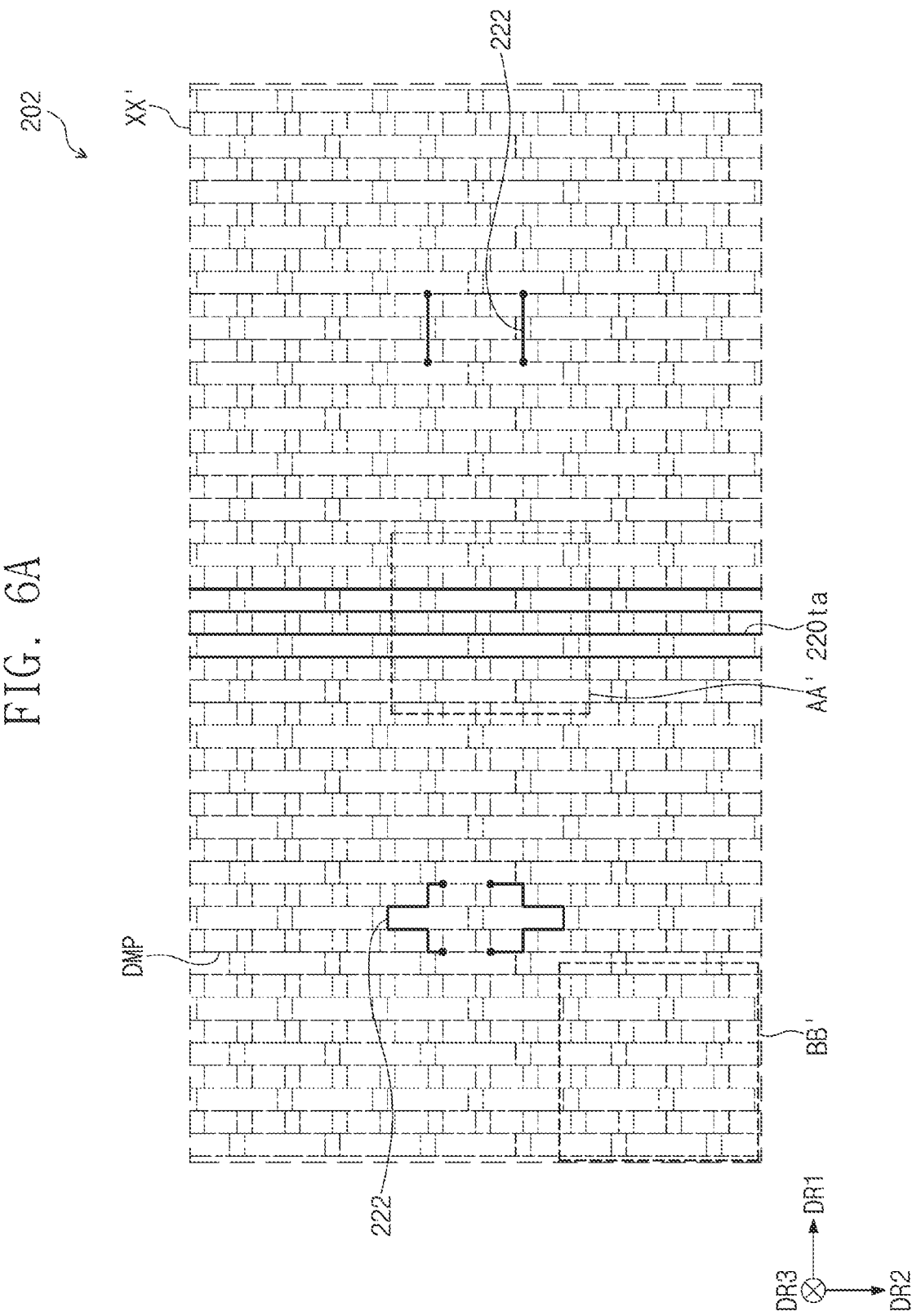

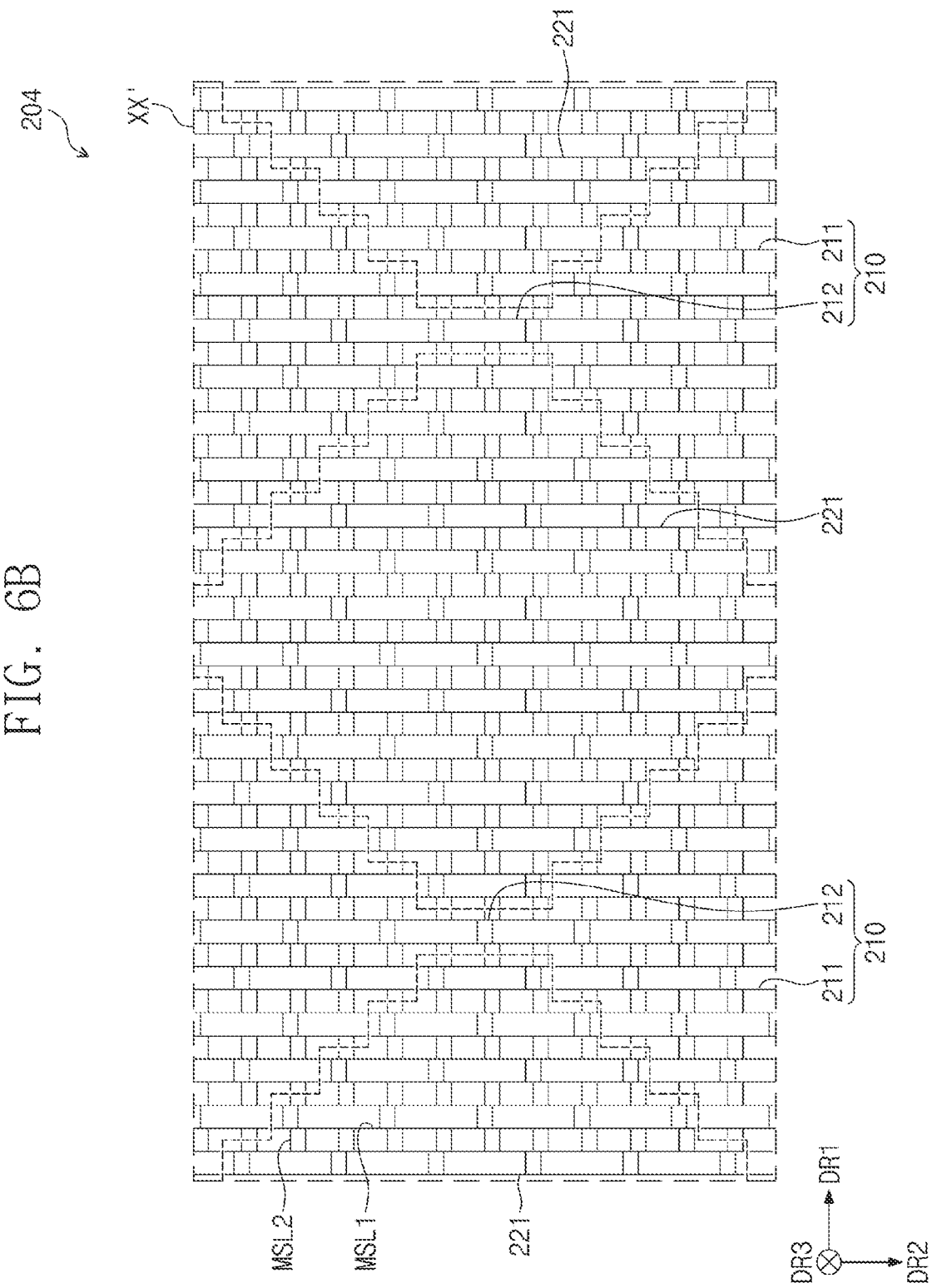

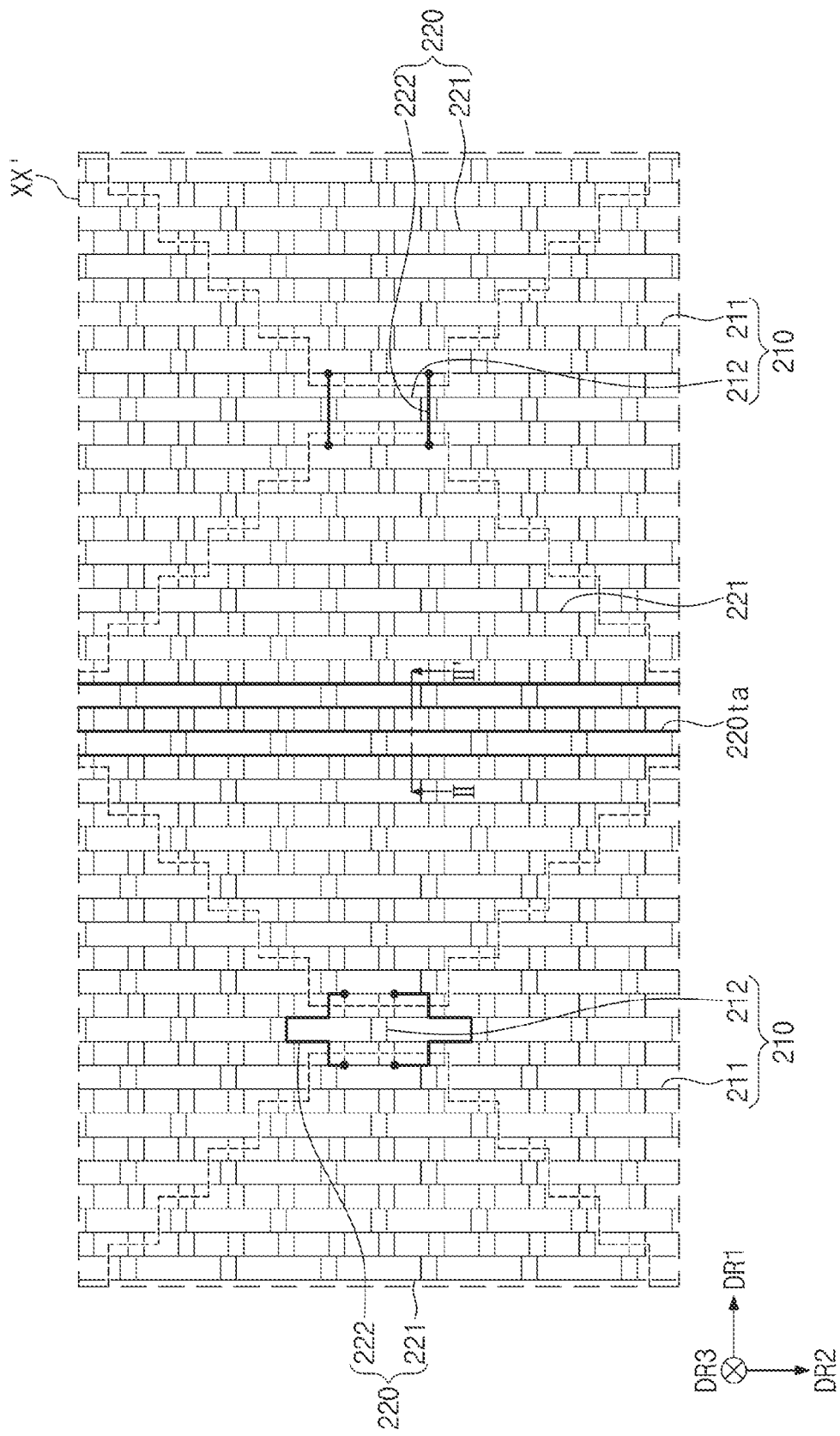

ELECTRONIC DEVICE

CROSS-REFERENCE TO RELATED APPLICATIONS

This application claims priority under 35 U.S.C. § 119 to Korean Patent Application Nos. 10-2022-0128106, filed on Oct. 6, 2022, and 10-2022-0174464, filed on Dec. 14, 2022, respectively, in the Korean Intellectual Property Office, the disclosures of which are incorporated by reference herein in their entireties.

TECHNICAL FIELD

The present disclosure relates to an electronic device including a sensor.

DISCUSSION OF RELATED ART

Multimedia electronic devices such as a television, a mobile phone, a tablet computer, a navigation system, a game console, etc. may display an image, and may provide, in addition to a general input method such as a button, a keyboard, a mouse, etc., a touch-based input method that allows a user to enter information or commands easily and intuitively.

The multimedia electronic device may include a display unit for displaying an image in a display area, and a sensing unit to sense an external input applied from outside. A user may input information by pressing or touching the sensing unit with user's body (e.g., a finger) or an input device (e.g., a pen), while viewing an image displayed by the display unit. The sensing unit may include sensing electrodes and sensing lines connected to the sensing electrodes. The sensing lines may be disposed in a peripheral area, and thus, the multimedia electronic device may require a large peripheral area to accommodate the sensing lines.

SUMMARY

Embodiments of the present disclosure provide an electronic device including a sensor having enhanced sensing performance.

According to an embodiment of the present disclosure, an electronic device includes a sensor in which a sensing area and a peripheral area adjacent to the sensing area are defined. The sensor includes a plurality of first sensing electrodes arranged in a first direction, a plurality of second sensing electrodes arranged in a second direction intersecting the first direction, a plurality of first trace lines electrically connected to the plurality of first sensing electrodes, respectively, and a plurality of second trace lines electrically connected to the plurality of second sensing electrodes, respectively. Each of the plurality of second trace lines includes a plurality of sub-lines overlapping the sensing area and the plurality of sub-lines are spaced apart from one another.

According to an embodiment of the present disclosure, the plurality of sub-lines may be connected to one of the plurality of second sensing electrodes through a plurality of contacts, respectively, and the plurality of contacts may overlap the sensing area.

According to an embodiment of the present disclosure, the plurality of sub-lines may be connected to each other only at one end.

According to an embodiment of the present disclosure, each of the plurality of second trace lines may further include a connection line connecting the plurality of sub-lines.

According to an embodiment of the present disclosure, the connection line may overlap the sensing area.

According to an embodiment of the present disclosure, the connection line may overlap the peripheral area.

According to an embodiment of the present disclosure, each of the plurality of second trace lines may further include a common line connected to the plurality of sub-lines and disposed in the peripheral area.

According to an embodiment of the present disclosure, the plurality of sub-lines may extend in the second direction.

According to an embodiment of the present disclosure, each of the plurality of sub-lines may have a straight line shape.

According to an embodiment of the present disclosure, each of the plurality of second sensing electrodes may further include a plurality of sensing patterns and a plurality of bridge patterns electrically connecting the plurality of sensing patterns, and the plurality of bridge patterns and the plurality of sub-lines may be disposed on a same layer.

According to an embodiment of the present disclosure, the plurality of sensing patterns and the plurality of first sensing electrodes may be disposed on a layer different from that of the plurality of sub-lines.

According to an embodiment of the present disclosure, the sensor may further include a plurality of dummy electrodes disposed on a layer the same as that of the plurality of sub-lines and electrically floated.

According to an embodiment of the present disclosure, the sensor may be divided into a plurality of sensing units, each of the plurality of sensing units may include an intersection area in which a corresponding first sensing electrode among the plurality of first sensing electrodes and a corresponding second sensing electrode among the plurality of second sensing electrodes intersect, and a maximum area of one dummy electrode among the plurality of dummy electrodes may be about 0.02% or less of a total area of dummy electrodes overlapping the intersection area among the plurality of dummy electrodes.

According to an embodiment of the present disclosure, each of the plurality of first sensing electrodes and the plurality of second sensing electrodes may include a plurality of mesh lines extending in the first direction and the second direction, and each of the plurality of sub-lines may include only a line extending in the second direction.

According to an embodiment of the present disclosure, an electronic device includes a plurality of first sensing electrodes arranged in a first direction, a plurality of second sensing electrodes arranged in a second direction intersecting the first direction, and a plurality of trace lines electrically connected to the plurality of second sensing electrodes, respectively. Each of the plurality of trace lines includes a plurality of sub-lines and each of the plurality of sub-lines includes only a line extending in the second direction.

According to an embodiment of the present disclosure, the plurality of sub-lines may be connected to one of the plurality of second sensing electrodes respectively through a plurality of contacts overlapping the one of the plurality of second sensing electrodes, and the plurality of sub-lines may be connected to each other only at one ends spaced apart from the plurality of contacts.

According to an embodiment of the present disclosure, each of the plurality of trace lines may further include a connection line connecting the plurality of sub-lines and a common line connected to the connection line.

According to an embodiment of the present disclosure, each of the plurality of second sensing electrodes may further include a plurality of sensing patterns and a plurality of bridge patterns electrically connecting the plurality of sensing patterns, the plurality of bridge patterns and the plurality of sub-lines may be disposed on a same layer, and the plurality of sensing patterns and the plurality of first sensing electrodes may be disposed on a layer different from that of the plurality of sub-lines.

According to an embodiment of the present disclosure, the electronic device may further include a plurality of dummy electrodes disposed on a layer the same as that of the plurality of sub-lines and electrically floated, and an intersection area in which one of the plurality of first sensing electrodes and one of the plurality of second sensing electrodes intersect may be defined, and a maximum area of one dummy electrode among the plurality of dummy electrodes may be about 0.02% or less of a total area of dummy electrodes overlapping the intersection area among the plurality of dummy electrodes.

According to an embodiment of the present disclosure, each of the plurality of first sensing electrodes and the plurality of second sensing electrodes may include a plurality of mesh lines extending in the first direction and the second direction.

According to an embodiment of the present disclosure, an electronic device includes a plurality of first sensing electrodes arranged in a first direction, a plurality of second sensing electrodes arranged in a second direction intersecting the first direction, and a plurality of sub-lines extending in the second direction and connected to one of the plurality of second sensing electrodes through a plurality of contacts, respectively. The plurality of contacts overlap the one of the plurality of second sensing electrodes, and the plurality of sub-lines are connected to each other only at one ends spaced apart from the plurality of contacts.

BRIEF DESCRIPTION OF THE DRAWINGS

The above and other objects and features of the present disclosure will become apparent by describing in detail embodiments thereof with reference to the accompanying drawings, in which:

FIG. 6A is a plan view illustrating a first sensor conductive layer corresponding to an area XX' illustrated in FIG. 5;

FIG. 6B is a plan view illustrating a second sensor conductive layer corresponding to an area XX' illustrated in FIG. 5;

FIG. 7 is an enlarged plan view of an area XX' illustrated in FIG. 5;

Figure 1:
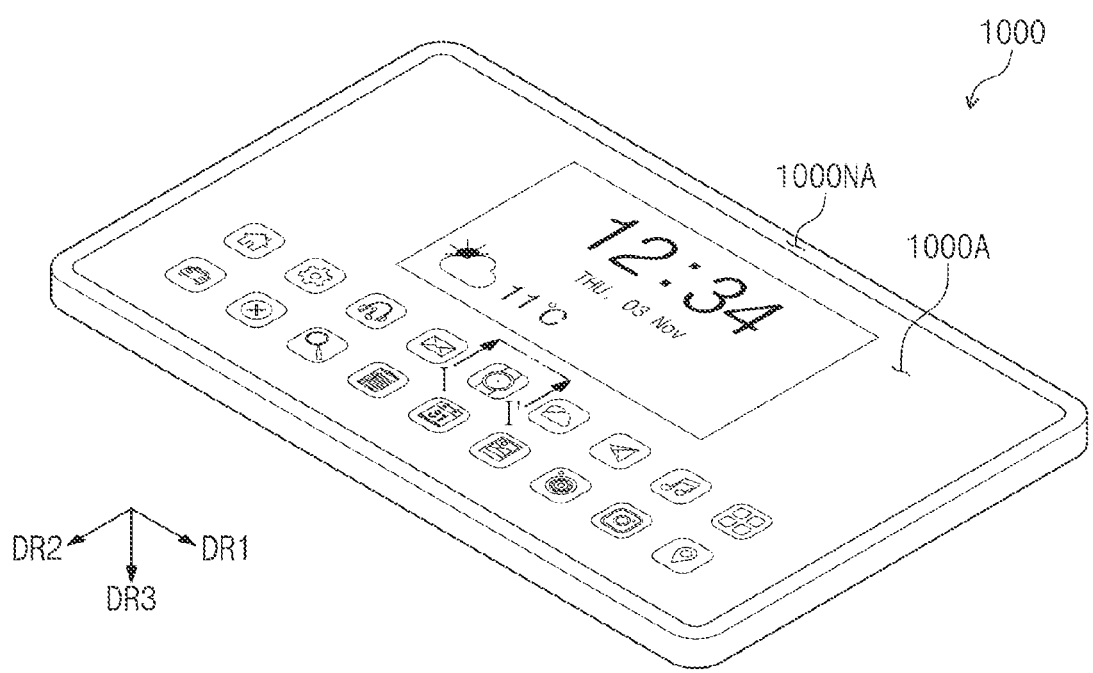
FIG. 1 is a perspective view of an electronic device, according to an embodiment of the present disclosure.

Since the drawings in FIGS. 1-12 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing. These relative terms are intended to encompass different orientations of the device in use or operation, in addition to the orientation depicted in the drawings.

It will be understood that the terms "include", "comprise", "have", etc. specify the presence of features, numbers, steps, operations, elements, or components, described in the specification, or a combination thereof, not precluding the presence or addition of one or more other features, numbers, steps, operations, elements, or components, or a combination thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to the accompanying drawings.

FIG. 1 is a perspective view illustrating an electronic device 1000 according to an embodiment of the present disclosure.

Referring to FIG. 1, the electronic device 1000 may be a device that is activated depending on an electrical signal. For example, the electronic device 1000 may include, for example, a mobile phone, a foldable mobile phone, a notebook, a personal computer, a television, a camera, a tablet, a car navigation system, a game console, or a wearable device, but the present disclosure is not limited thereto. FIG. 1 illustrates that the electronic device 1000 is a tablet as an example.

An active area 1000A and a peripheral area 1000NA may be defined in the electronic device 1000. The electronic device 1000 may display an image through the active area 1000A. The active area 1000A may include a surface defined by a first direction DR1 and a second direction DR2. The peripheral area 1000NA may surround the active area 1000A. In an embodiment of the present disclosure, the peripheral area 1000NA may be omitted. In an embodiment of the present disclosure, the electronic device 1000 may have a rectangular shape which has long sides extending in the first direction DR1 and short sides extending in the second direction DR2 which crosses the first direction DR1. In addition, the electronic device 1000 may approximately have a quadrangular shape, and its four corner portions may have a round shape having a predetermined curvature. However, the present disclosure is not limited thereto. The electronic device 1000 may have various shapes such as, for example, a circular shape or a polygonal shape.

The thickness direction of the electronic device 1000 may be parallel to a third direction DR3 crossing the first direction DR1 and the second direction DR2. Accordingly, front surfaces (or top surfaces) and rear surfaces (or bottom surfaces) of members constituting the electronic device 1000 may be defined based on the third direction DR3.

Although FIG. 1 illustrates the electronic device 1000 of a bar type, for example, having a rectangular shape, by way of example, the present disclosure is not limited thereto. For example, the descriptions to be described below may be applied to various electronic devices such as, for example, the foldable electronic device 1000, the rollable electronic device 1000, or the slideable electronic device 1000.

Figure 2:
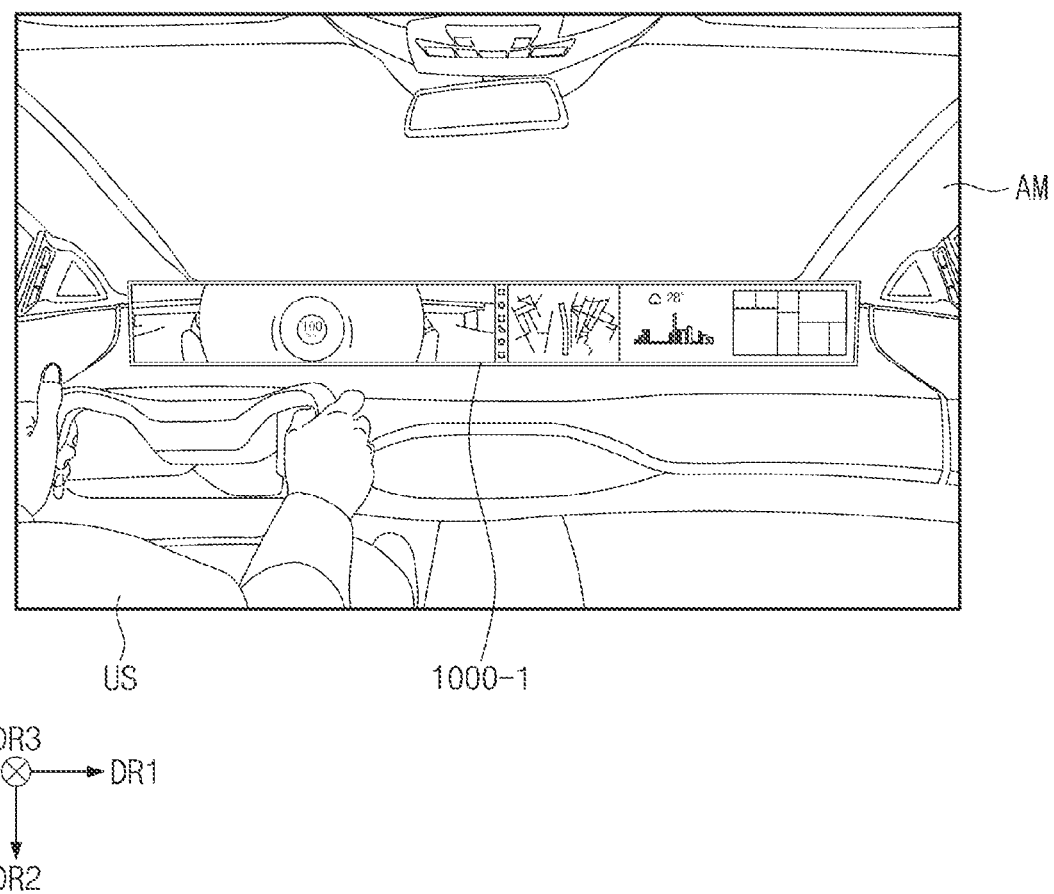
FIG. 2 is a diagram illustrating an interior of a vehicle in which an electronic device according to an embodiment of the present disclosure is disposed.

FIG. 2 is a diagram illustrating an interior of a vehicle AM in which an electronic device 1000-1 according to an embodiment of the present disclosure is disposed.

Referring to FIG. 2, the electronic device 1000-1 may be disposed inside the vehicle AM. In FIG. 2, one electronic device 1000-1 is illustrated as being disposed inside the vehicle AM as an example, but the present disclosure is not limited thereto. For example, a plurality of electronic devices may be disposed inside the vehicle AM. In this case, the plurality of electronic devices may include an electronic device disposed in front of a driver US and an electronic device facing the passenger seat.

The electronic device 1000-1 may display images necessary for driving to the driver US who is driving. For example, the electronic device 1000-1 may display, for example, speed information, vehicle condition information, vehicle interior manipulation information, and navigation information. In addition, the electronic device 1000-1 may display not only information necessary for driving, but also various information not related to driving.

As the electronic device 1000-1 is applied to various products (e.g., vehicles), an aspect ratio (e.g., a ratio of width to height) of the electronic device 1000-1 may also vary.

Figure 3:
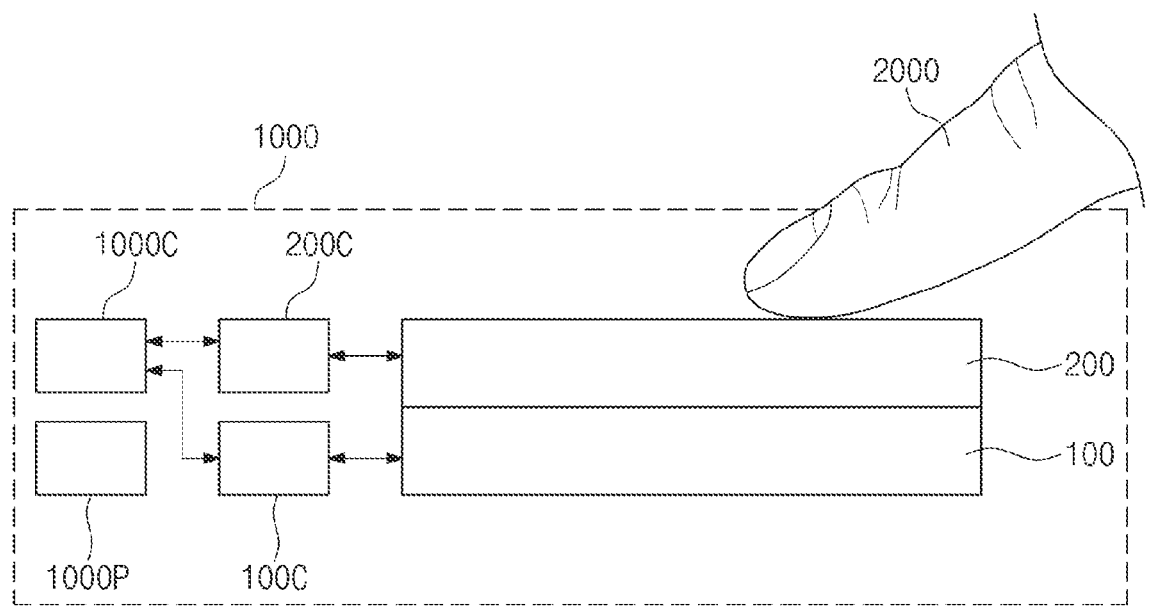
FIG. 3 is a block diagram schematically illustrating a use example of an electronic device, according to an embodiment of the present disclosure.

FIG. 3 is a block diagram schematically illustrating a use example of the electronic device 1000, according to an embodiment of the present disclosure.

Referring to FIG. 3, the electronic device 1000 may include a display layer 100, a sensor 200, a display driver 100C, a sensor driver 200C, a main driver 1000C, and a power supply circuit 1000P.

The display layer 100 may be a layer configured to actually generate an image. The display layer 100 may be a light emitting display layer. For example, the display layer 100 may be an organic light emitting display layer, an inorganic light emitting display layer, an organic-inorganic display layer, a quantum dot display layer, a micro-LED display layer, or a nano-LED display layer. The organic light emitting display layer may include an organic light emitting material. The quantum dot display layer may include quantum dots, quantum rods, and the like. The quantum dots and the quantum rods may be small semiconductor particles which are several nanometers in size.

The sensor 200 may be disposed on the display layer 100. The sensor 200 may sense an external input applied from outside. The sensor 200 may be an integrated sensor continuously formed during the manufacturing process of the display layer 100, or the sensor 200 may be an external sensor attached to the display layer 100. The sensor 200 may sense an external input in a capacitive manner. Alternatively, the sensor 200 may sense an external input by using an electromagnetic induction method or a pressure sensing method.

The main driver 1000C may control the overall operation of the electronic device 1000. For example, the main driver 1000C may control operations of the display driver 100C and the sensor driver 200C. The main driver 1000C may include at least one microprocessor, and the main driver 1000C may be referred to as a host. The main driver 1000C may further include a graphics controller.

The display driver 100C may drive the display layer 100. For example, the display driver 100C may output signals and voltages for driving the display layer 100. The display driver 100C may receive image data and a control signal from the main driver 1000C. The control signal may include various signals. For example, the control signal may include an input vertical synchronization signal, an input horizontal synchronization signal, a main clock signal, an image signal (which may include information of image colors, such as, red, green and blue), and a data enable signal.

The sensor driver 200C may drive the sensor 200. The sensor driver 200C may receive a control signal from the main driver 1000C. The control signal may include a clock signal of the sensor driver 200C.

The power supply circuit 1000P may include a power management integrated circuit (PMIC). The power supply circuit 1000P may generate a plurality of driving voltages for driving the display layer 100, the sensor 200, the display driver 100C, and the sensor driver 200C. For example, the plurality of driving voltages may include, for example, a gate high voltage, a gate low voltage, a driving voltage, a common voltage, an initialization voltage, etc., but the present disclosure is not limited thereto.

The electronic device 1000 may detect inputs applied from outside. For example, the electronic device 1000 may sense a passive input by a touch 2000. The touch 2000 may include all input means capable of providing a change to a capacitance, such as a user's body (e.g., a finger) and an input device (e.g., a pen). The touch 2000 may include a case where an object such as a user's boy or a pen directly contacts the front surface of the electronic device 1000. Further, the touch 2000 may include a case where an object such as a user's body or a pen is located closely (hovered) on the front surface of the electronic device 1000.

Figure 4:
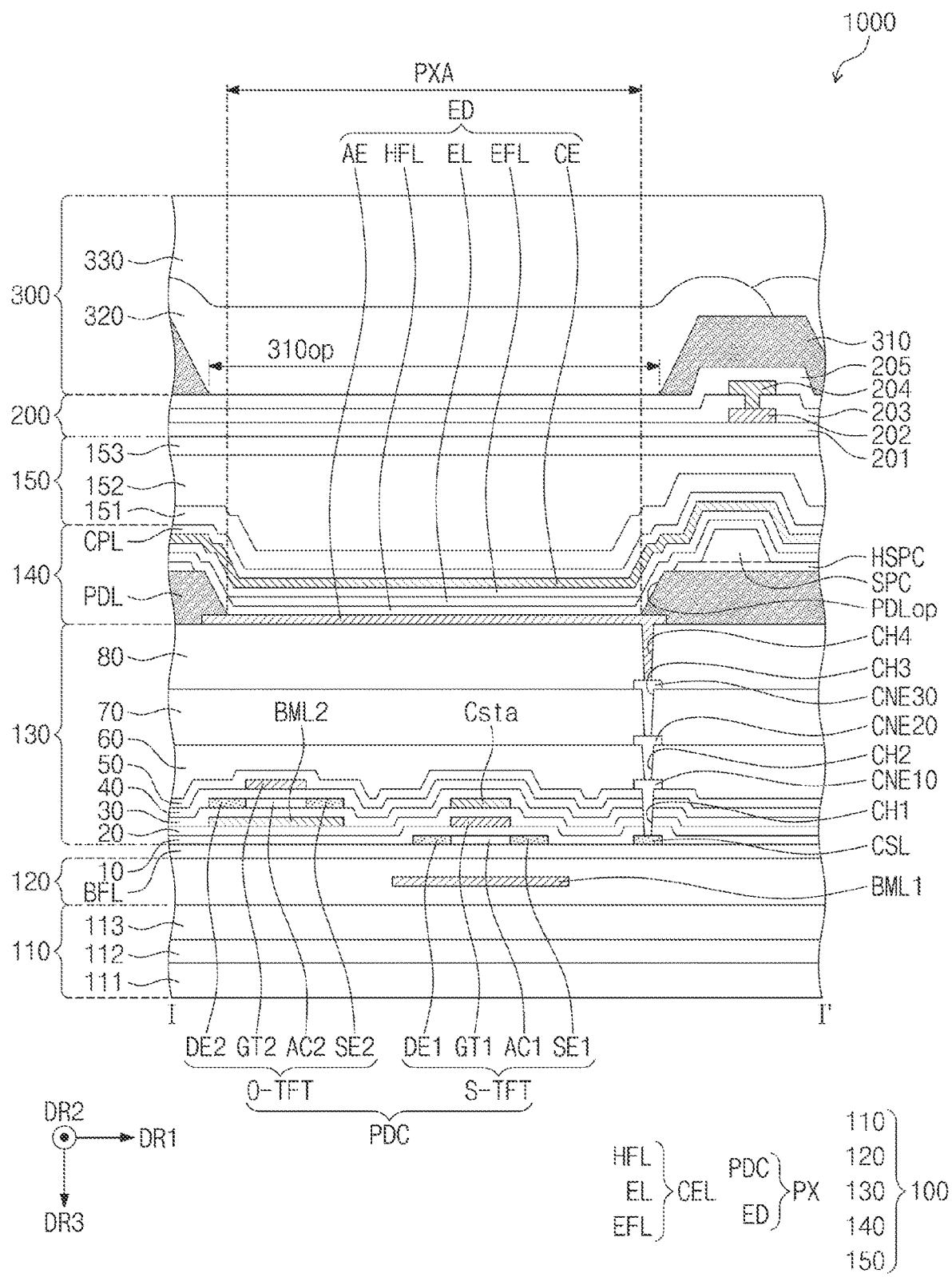
FIG. 4 is a cross-sectional view of an electronic device, according to an embodiment of the present disclosure.

FIG. 4 is a cross-sectional view of the electronic device 1000, according to an embodiment of the present disclosure. For example, FIG. 4 may be a cross-sectional view taken along line I-I' of FIG. 1.

Referring to FIG. 4, the electronic device 1000 may include the display layer 100, the sensor 200, and an anti-reflection layer 300. The display layer 100 may include a base layer 110, a barrier layer 120, a buffer layer BFL, a circuit layer 130, a device layer 140, and an encapsulation layer 150.

The base layer 110 may have a single-layered structure or a multi-layered structure. For example, the base layer 110 may include first to third sub-base layers 111, 112, and 113. Each of the first sub-base layer 111 and the third sub-base layer 113 may include at least one of, for example, polyimide-based resin, acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. Meanwhile, the wording "~~-based resin" in the specification indicates that "~~-based resin" includes a functional group of "~~". For example, each of the first sub-base layer 111 and the third sub-base layer 113 may include polyimide.

The second sub-base layer 112 may have a single-layered structure or a multi-layered structure. For example, the second sub-base layer 112 may include an inorganic material and may include at least one of, for example, silicon oxide ($SiO_2$), silicon nitride ($Si_3N_4$), silicon oxynitride (SiON), or amorphous silicon (a-Si). For example, the second sub-base layer 112 may include silicon oxynitride (SiON) and silicon oxide ($SiO_2$) stacked thereon.

The barrier layer 120 may be disposed on the base layer 110. The barrier layer 120 may have a single-layered structure or a multi-layered structure. The barrier layer 120 may include at least one of, for example, silicon oxide ($SiO_2$), silicon nitride ($Si_3N_4$), silicon oxynitride (SiON), or amorphous silicon (a-Si).

The barrier layer 120 may further include a first lower light blocking layer BML1. For example, when the barrier layer 120 has a multi-layered structure, the first lower light blocking layer BML1 may be disposed between layers constituting the barrier layer 120. However, the present disclosure is not limited thereto, and the first lower light blocking layer BML1 may be disposed between the base layer 110 and the barrier layer 120 or may be disposed on the barrier layer 120. In an embodiment of the present disclosure, the first lower light blocking layer BML1 may be omitted. The first lower light blocking layer BML1 is referred to as a first lower layer, a first lower metal layer, a first lower electrode layer, a first lower shielding layer, a first light blocking layer, a first metal layer, a first shielding layer, or a first overlap layer.

The buffer layer BFL may be disposed on the barrier layer 120. The buffer layer BFL may prevent a phenomenon in which metal atoms or impurities from the base layer 110 diffuse into the first semiconductor pattern. In addition, the buffer layer BFL may adjust the speed of applying heat during a crystallization process for forming the first semiconductor pattern such that the first semiconductor pattern is uniformly formed. For example, the buffer layer BFL may be formed of an inorganic layer such as, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, or an aluminum oxide ($Al_2O_3$) layer.

The buffer layer BFL may include a plurality of inorganic layers. For example, the buffer layer BFL may include a first sub-buffer layer containing silicon nitride ($Si_3N_4$), and a second sub-buffer layer disposed on the first sub-buffer layer and containing silicon oxide ($SiO_2$).

The circuit layer 130 may be disposed on the buffer layer BFL, and the device layer 140 may be disposed on the circuit layer 130. The active area 1000A may include a plurality of pixels PX to display an image. Each of the pixels PX may include a pixel circuit PDC and a light emitting device ED electrically connected with the pixel circuit PDC. The pixel circuit PDC may be included in the circuit layer 130, and the light emitting device ED may be included in the device layer 140.

FIG. 4 illustrates a silicon thin film transistor S-TFT and an oxide thin film transistor O-TFT of the pixel circuit PDC. However, all transistors constituting the pixel circuit PDC may be the silicon thin film transistors S-TFT or the oxide thin film transistors O-TFT.

The first semiconductor pattern may be disposed on the buffer layer BFL. The first semiconductor pattern may include a silicon (Si) semiconductor. For example, the silicon (Si) semiconductor may include amorphous silicon (a-Si) or polycrystalline silicon (pc-Si). For example, the first semiconductor pattern may include low-temperature polysilicon (p-Si).

FIG. 4 illustrates only a portion of the first semiconductor pattern disposed on the buffer layer BFL, and the first semiconductor pattern may be further disposed in another area. The first semiconductor patterns may be arranged across the pixels in compliance with a specific rule. An electrical property of the first semiconductor pattern may vary depending on whether it is doped. The first semiconductor pattern may include a first area whose conductivity is high and a second area whose conductivity is low. The first area may be doped with an N-type dopant or a P-type dopant. A P-type transistor may include a doping area doped with the P-type dopant, and an N-type transistor may include a doping area doped with the N-type dopant. For example, the N-type dopant may include, for example, phosphorus (P), arsenic (As), or antimony (Sb), and the P-type dopant may include, for example, aluminum (Al), boron (B), or indium (In). The second area may be a non-doping area or may be an area doped at a lower concentration than the first area.

The conductivity of the first area may be higher than the conductivity of the second area, and the first area may substantially serve as an electrode or a signal line. For example, the first area may be heavily doped with a dopant or dopants to have high conductivity, while the second area may not be doped. The second area may substantially correspond to an active area (or channel) of a transistor. In other words, a portion of the first semiconductor pattern may be an active area of a transistor, another portion of the first semiconductor pattern may be a source area or a drain area of the transistor, and the other portion of the first semiconductor pattern may be a connection electrode or a connection signal line.

A source area SE1, an active area AC1, and a drain area DE1 of the silicon thin film transistor S-TFT may be formed from the first semiconductor pattern. The source area SE1 and the drain area DE1 may extend from the active area AC1 in directions opposite to each other, when viewed in a cross-sectional view.

A portion of a connection signal line CSL formed from the first semiconductor pattern is illustrated in FIG. 4.

The circuit layer 130 may include a plurality of inorganic layers and a plurality of organic layers. In an embodiment of the present disclosure, the first to fifth insulating layers 10, 20, 30, 40, and 50 sequentially stacked on the buffer layer BFL may be inorganic layers, and the sixth to eighth insulating layers 60, 70, and 80 may be organic layers.

A first insulating layer 10 may be disposed on the buffer layer BFL. The first insulating layer 10 may cover the first semiconductor pattern. The first insulating layer 10 may be an inorganic layer and/or an organic layer, and may have a single-layered structure or a multi-layered structure. The first insulating layer 10 may include at least one of, for example, aluminum oxide ($Al_2O_3$), titanium oxide ($TiO_2$), silicon oxide ($SiO_2$), silicon nitride ($Si_3N_4$), silicon oxynitride (SiON), zirconium oxide ($ZrO_2$), or a hafnium oxide ($HfO_2$). In an embodiment of the present disclosure, the first insulating layer 10 may be a silicon oxide ($SiO_2$) layer having a single layer. The insulating layer of the circuit layer 130 to be described later as well as the first insulating layer 10 may have a single-layered structure or a multi-layered structure.

A gate electrode GT1 of the silicon thin film transistor S-TFT is disposed on the first insulating layer 10. The gate electrode GT1 may be a portion of a metal pattern. The gate electrode GT1 overlaps the active area AC. The gate electrode GT1 may function as a mask in a process of doping the first semiconductor pattern. The gate electrode GT1 may include, for example, titanium (Ti), silver (Ag), an alloy containing silver (Si), molybdenum (Mo), an alloy containing molybdenum (Mo), aluminum (Al), an alloy containing aluminum (Al), aluminum nitride (AlN), tungsten (W), tungsten nitride (WN), copper (Cu), indium tin oxide (ITO), or indium zinc oxide (IZO), but the present disclosure is not limited thereto. The gate electrode GT1 may have a single-layered structure or a multi-layered structure. In an embodiment of the present disclosure, the gate electrode GT1 may be formed by stacking a plurality of conductive layers, for example, may include a work-function control film that controls a work-function and a filling conductive film that fills a space defined by the work-function control film.

A second insulating layer 20 may be disposed on the first insulating layer 10 and may cover the gate electrode GT1. The second insulating layer 20 may be an inorganic layer, and may have a single-layered structure or a multi-layered structure. The second insulating layer 20 may include at least one of silicon oxide ($SiO_2$), silicon nitride ($Si_3N_4$), or silicon oxynitride (SiON). In an embodiment of the present disclosure, the second insulating layer 20 may have a single-layered structure including a silicon nitride ($Si_3N_4$) layer.

A third insulating layer 30 may be disposed on the second insulating layer 20. The third insulating layer 30 may be an inorganic layer, and may have a single-layered structure or a multi-layered structure. In an embodiment of the present disclosure, the third insulating layer 30 may have a multi-layered structure including a silicon oxide ($SiO_2$) layer and a silicon nitride ($Si_3N_4$) layer. An electrode Csta of a capacitor may be disposed between the second insulating layer 20 and the third insulating layer 30. The electrode Csta of a capacitor may be formed as a single layer or multiple layers including, for example, any one of molybdenum (Mo), aluminum (Al), chromium (Cr), gold (Au), titanium (Ti), nickel (Ni), neodymium (Nd), tungsten (W), and copper (Cu), or an alloy thereof. Also, another electrode, which may be the gate electrode GT1, of the capacitor may be disposed between the first insulating layer 10 and the second insulating layer 20. The electrode Csta of a capacitor may overlap the gate electrode GT1 of the silicon thin film transistor S-TFT in the third direction DR3. Since the second insulating layer 20 has a predetermined dielectric constant, a capacitor may be formed by the electrode Csta of a capacitor, the gate electrode GT1, and the second insulating layer 20 disposed therebetween.

A second semiconductor pattern may be disposed on the third insulating layer 30. The second semiconductor pattern may include an oxide semiconductor. The oxide semiconductor may include a plurality of areas that are distinguished depending on whether the metal oxide is reduced. An area (hereinafter referred to as a "reduction area") in which the metal oxide is reduced has higher conductivity than an area (hereinafter referred to as a "non-reduction area") in which the metal oxide is not reduced. The reduction area may actually serve as a source/drain of a transistor or a signal line. The non-reduction area actually corresponds to an active area (alternatively, a semiconductor area or a channel) of a transistor. In other words, a portion of the second semiconductor pattern may be an active area of a transistor, another portion thereof may be a source area or a drain area of the transistor, and the other portion may be a signal transfer area. The oxide semiconductor may include, for example, a binary compound ($AB_x$), a ternary compound ($AB_xC_y$), or a quaternary compound ($AB_xC_yD_z$) containing an oxide of, for example, indium (In), zinc (Zn), gallium (Ga), tin (Sn), titanium (Ti), aluminum (Al), hafnium (Hf), zirconium (Zr), magnesium (Mg), and/or the like.

A source area SE2, an active area AC2, and a drain area DE2 of the oxide thin film transistor O-TFT may be formed from the second semiconductor pattern. The source area SE2 and the drain area DE2 may extend from the active area AC2 in directions opposite to each other, when viewed in a cross-sectional view.

A fourth insulating layer 40 may be disposed on the third insulating layer 30. The fourth insulating layer 40 may cover the second semiconductor pattern. The fourth insulating layer 40 may be an inorganic layer, and may have a single-layered structure or a multi-layered structure. The fourth insulating layer 40 may include at least one of, for example, aluminum oxide ($Al_2O_3$), titanium oxide ($TiO_2$), silicon oxide ($SiO_2$), silicon nitride ($Si_3N_4$), silicon oxynitride (SiON), zirconium oxide ($ZrO_2$), or hafnium oxide ($HfO_2$). In an embodiment of the present disclosure, the fourth insulating layer 40 may have a single-layered structure including silicon oxide ($SiO_2$).

A gate electrode GT2 of the oxide thin film transistor O-TFT is disposed on the fourth insulating layer 40. The gate electrode GT2 may be a portion of a metal pattern. The gate electrode GT2 overlaps the active area AC2. The gate electrode GT2 may function as a mask in a process of reducing the second semiconductor pattern.

A second lower light blocking layer BML2 may be disposed under the oxide thin film transistor O-TFT. The second lower light blocking layer BML2 may be disposed between the second insulating layer 20 and the third insulating layer 30. The second lower light blocking layer BML2 includes a material the same as that of the electrode Csta of a capacitor and may be formed through the same process.

A fifth insulating layer 50 may be disposed on the fourth insulating layer 40 and may cover the gate electrode GT2. The fifth insulating layer 50 may be an inorganic layer and/or an organic layer, and may have a single-layered structure or a multi-layered structure. In an embodiment of the present disclosure, the fifth insulating layer 50 may have a multi-layered structure including a silicon oxide ($SiO_2$) layer and a silicon nitride ($Si_3N_4$) layer.

A first connection electrode CNE10 may be disposed on the fifth insulating layer 50. The first connection electrode CNE10 may be connected with the connection signal line CSL through a first contact hole CH1 penetrating the first to fifth insulating layers 10, 20, 30, 40, and 50.

A sixth insulating layer 60 may be disposed on the fifth insulating layer 50. A second connection electrode CNE20 may be disposed on the sixth insulating layer 60. The second connection electrode CNE20 may be connected with the first connection electrode CNE10 through a second contact hole CH2 penetrating the sixth insulating layer 60.

A seventh insulating layer 70 may be disposed on the sixth insulating layer 60 and may cover the second connection electrode CNE20.

A third connection electrode CNE30 may be disposed on the seventh insulating layer 70. The third connection electrode CNE30 may be connected with the second connection electrode CNE20 through a third contact hole CH3 penetrating the seventh insulating layer 70. An eighth insulating layer 80 may be disposed on the seventh insulating layer 70 and may cover the third connection electrode CNE30.

Each of the sixth insulating layer 60, the seventh insulating layer 70, and the eighth insulating layer 80 may be an organic layer. For example, each of the sixth insulating layer 60, the seventh insulating layer 70, and the eighth insulating layer 80 may include general purpose polymers such as, for example, Benzocyclobutene (BCB), polyimide (PI), Hexamethyldisiloxane (HMDSO), Polymethylmethacrylate (PMMA) or Polystyrene (PS), a polymer derivative having a phenolic group, an acrylic polymer, an imide-based polymer, an acryl ether polymer, an amide-based polymer, a fluorine-based polymer, a p-xylene-based polymer, a vinyl alcohol-based polymer, or the blend thereof.

The light emitting device ED may include a first electrode AE, a first functional layer HFL, an emission layer EL, a second functional layer EFL, and a second electrode CE. The first functional layer HFL, the second functional layer EFL, and the second electrode CE may be commonly provided to pixels PX. The first functional layer HFL, the emission layer EL, and the second functional layer EFL may be referred to as an intermediate layer CEL. The first functional layer HFL may be referred to as a hole control layer. The second functional layer EFL may be referred to as an electron control layer. The first electrode AE may be referred to as a pixel electrode or an anode, and the second electrode CE may be referred to as a common electrode or a cathode.

The first electrode AE may be disposed on the eighth insulating layer 80. The first electrode AE may be connected to the third connection electrode CNE30 electrically connected to the pixel circuit PDC through a fourth contact hole CH4 penetrating the eighth insulating layer 80.

In an embodiment of the present disclosure, the third connection electrode CNE30 may be omitted. In this case, the first electrode AE may be connected to the second connection electrode CNE20 through the seventh and eighth insulating layers 70 and 80. Also, in an embodiment of the present disclosure, the third connection electrode CNE30 and the eighth insulating layer 80 may be omitted. In this case, the first electrode AE may be disposed on the seventh insulating layer 70, and may be connected to the second connection electrode CNE20 through the seventh insulating layer 70.

The first electrode AE may be a transflective electrode, a light transmitting electrode, or a reflective electrode. As an embodiment of the present disclosure, the first electrode AE may include a reflective layer formed of, for example, silver (Ag), magnesium (Mg), aluminum (Al), platinum (Pt), palladium (Pd), gold (Au), nickel (Ni), neodymium (Nd), iridium (Ir), chromium (Cr), or a compound thereof, and a transparent or semi-transparent electrode layer formed on the reflective layer. The transparent electrode layer or the semi-transparent electrode layer may include at least one selected from a group including, for example, indium tin oxide (ITO), indium zinc oxide (IZO), indium gallium zinc oxide (IGZO), zinc oxide (ZnO), indium oxide ($In_2O_3$), and aluminum-doped zinc oxide (AZO). For example, the first electrode AE may include a multi-layered structure such as, for example, ITO/Ag/ITO in which indium tin oxide (ITO), silver (Ag), and indium tin oxide (ITO) are sequentially stacked, or ITO/Al/ITO in which indium tin oxide (ITO), aluminum (Al), and indium tin oxide (ITO) are sequentially stacked.

A pixel defining layer PDL may be disposed on the eighth insulating layer 80. The pixel defining layer PDL may have a property of absorbing a light. For example, the pixel defining layer PDL may have a black color. The pixel defining layer PDL may include a black coloring agent. The black coloring agent may include a black dye and/or a black pigment. The black coloring agent may include carbon black, or metal such as chrome or an oxide thereof.

An opening PDLop that exposes a portion of the first electrode AE may be defined in the pixel defining layer PDL. That is, the pixel defining layer PDL may cover an edge portion of the first electrode AE. The pixel defining layer PDL may prevent an arc or the like from occurring between the first electrode AE and the second electrode CE by increasing a distance between the edge of the first electrode AE and the second electrode CE located over the first electrode AE. An emission area PXA may be defined by the pixel defining layer PDL.

A spacer HSPC may be disposed on the pixel defining layer PDL. A protrusion spacer SPC may be disposed on the spacer HSPC. The spacer HSPC and the protrusion spacer SPC may have an integral shape and may be formed of the same material. For example, the spacer HSPC and the protrusion spacer SPC may be formed through the same process using a halftone mask. However, the present disclosure is not limited thereto. For example, the spacer HSPC and the protrusion spacer SPC may include different materials or may be formed by separate processes.

The first functional layer HFL may be disposed on the first electrode AE, the pixel defining layer PDL, the spacer HSPC, and the protrusion spacer SPC. The first functional layer HFL may include a hole transport layer (HTL), a hole injection layer (HIL), or both the hole transport layer and the hole injection layer. Each of these layers may be a single layer or multiple layers made of an organic material. The first functional layer HFL may be disposed over the entire display area.

The emission layer EL may be disposed on the first functional layer HFL and may be disposed in an area corresponding to the opening PDLop of the pixel defining layer PDL. The emission layer EL may include an organic material, an inorganic material, or an organic/inorganic material emitting light of a predetermined color. In an embodiment of the present disclosure, the emission layer EL may include a fluorescent material or a phosphorescent material. The emission layer EL may include a high molecular material or a low molecular material, and may emit red, green, or blue light for each pixel PX.

The second functional layer EFL is disposed on the first functional layer HFL and may cover the emission layer EL. The second functional layer EFL may include an electron transport layer ETL, an electron injection layer EIL, or both the electron transport layer and the electron injection layer. Each of these layers may be a single layer or multiple layers made of an organic material. The second functional layer EFL may be disposed over the entire display area.

The second electrode CE may be disposed on the second functional layer EFL. The second electrode CE may be disposed on the display area. In the top emission structure, the second electrode CE may include a transparent conductive material (TCO) such as, for example, indium tin oxide (ITO), zinc oxide (ZnO), indium oxide ($In_2O_3$) or indium zinc oxide (IZO), which can transmit light, or a semi-transmissive conductive material such as magnesium (Mg), silver (Ag) or an alloy of magnesium (Mg) and silver (Ag). When the second electrode CE includes a semi-transmissive conductive material, light emission efficiency may be increased by microcavities.

The emission layer EL may emit light in response to a potential difference between the first electrode AE and the second electrode CE. For example, when an anode voltage is applied to the first electrode AE and a cathode voltage is applied to the second electrode CE, the holes and electrons move to the emission layer EL, such that they combine in the emission layer EL to emit light.

The device layer 140 may further include a capping layer CPL disposed on the second electrode CE. The capping layer CPL may serve to enhance light emitting efficiency by the principle of constructive interference. For example, the capping layer CPL may include a material having a refractive index of 1.6 or more with respect to light having a wavelength of 589 nm. The capping layer CPL may be an organic capping layer including an organic material, an inorganic capping layer including an inorganic material, or a composite capping layer including an organic material and an inorganic material. For example, the capping layer may include, for example, carbocyclic compounds, heterocyclic compounds, amine group-containing compounds, porphine derivatives, phthalocyanine derivatives, naphthalocyanine derivatives, alkali metal complexes, alkaline earth metals complexes, or any combination thereof. The carbocyclic compound, heterocyclic compound, and amine group-containing compound are optionally substituted with substituents including, for example, oxygen (O), nitrogen (N), sulfur (S), selenium (Se), silicon (Si), fluorine (F), chlorine (Cl), bromine (Br), iodine (I), or any combination thereof.

The encapsulation layer 150 may be disposed on the device layer 140. The encapsulation layer 150 may include a first inorganic encapsulation layer 151, an organic encapsulation layer 152, and a second inorganic encapsulation layer 153 that are sequentially stacked. The first and second inorganic encapsulation layers 151 and 153 may protect the device layer 140 from moisture and oxygen, and the organic encapsulation layer 152 may protect the device layer 140 from a foreign substance such as dust particles. In an embodiment of the present disclosure, each of the first inorganic encapsulation layer 151 and the second inorganic encapsulation layer 153 may be formed of, for example, a silicon nitride ($Si_3N_4$) layer, a silicon oxynitride (SiON) layer, a silicon oxide ($SiO_2$) layer, a titanium oxide ($TiO_2$) layer, a tantalum oxide ($Ta_2O_5$) layer, a hafnium oxide ($HfO_2$) layer, and/or an aluminum oxide ($Al_2O_3$) layer. The organic encapsulation layer 152 may be formed of an organic material including, for example, an acrylic resin, an epoxy resin, a phenolic resin, a polyamide resin, or a polyimide resin.

In an embodiment of the present disclosure, a low refractive index layer may be further disposed between the capping layer CPL and the encapsulation layer 150. The low refractive index layer may include lithium fluoride (LiF). The low refractive index layer may be formed by thermal evaporation.

The sensor 200 may be disposed on the display layer 100. The sensor 200 may be referred to as a sensor layer, an input sensing layer, or an input sensing panel. The sensor 200 may include a sensor base layer 201, a first sensor conductive layer 202, a sensor insulating layer 203, a second sensor conductive layer 204, and a sensor cover layer 205.

The sensor base layer 201 may be directly disposed on the display layer 100. The sensor base layer 201 may be an inorganic layer including at least one of, for example, silicon nitride ($Si_3N_4$), silicon oxynitride (SiON), or silicon oxide ($SiO_2$). Alternatively, the sensor base layer 201 may be an organic layer including, for example, epoxy resin, acrylate resin, or imide-based resin. The sensor base layer 201 may have a single-layered structure or may have a multi-layered structure in which a plurality of layers are stacked in the third direction DR3.

Each of the first sensor conductive layer 202 and the second sensor conductive layer 204 may have a single-layered structure or a multi-layered structure in which a plurality of layers are stacked in the third direction DR3.

A conductive layer of a single-layered structure may include a metal layer or a transparent conductive layer. The metal layer may include molybdenum (Mo), silver (Ag), titanium (Ti), copper (Cu), aluminum (Al), or an alloy thereof. The transparent conductive layer may include a transparent conductive oxide such as, for example, indium tin oxide (ITO), indium zinc oxide (IZO), zinc oxide (ZnO), or indium zinc tin oxide (IZTO). In addition, the transparent conductive layer may include, for example, a conductive polymer such as poly (3,4-ethylenedioxythiophene) (PEDOT), metal nanowires, graphene, etc.

The multi-layered conductive layer may include metal layers. The metal layers may, for example, have a three-layered structure of titanium/aluminum/titanium (Ti/Al/Ti). The multi-layered conductive layer may include at least one metal layer and at least one transparent conductive layer. For example, the multi-layered conductive layer may have a three-layered structure of, for example, indium tin oxide/aluminum/indium tin oxide (ITO/Al/ITO), indium tin oxide/silver/indium tin oxide (ITO/Ag/ITO), or indium tin oxide/APC/indium tin oxide (ITO/APC/ITO). The APC alloy refers to an alloy of silver (Ag), palladium (Pd), and copper (Cu).

The sensor insulating layer 203 may be disposed between the first sensor conductive layer 202 and the second sensor conductive layer 204. The sensor insulating layer 203 may include an inorganic layer. The inorganic layer may include at least one of, for example, aluminum oxide ($Al_2O_3$), titanium oxide ($TiO_2$), silicon oxide ($SiO_2$), silicon nitride ($Si_3N_4$), silicon oxynitride (SiON), zirconium oxide ($ZrO_2$), or hafnium oxide ($HfO_2$).

The sensor insulating layer 203 may include an organic layer. The organic layer may include at least one of, for example, acrylic resin, methacrylic resin, polyisoprene, vinyl-based resin, epoxy-based resin, urethane-based resin, cellulose-based resin, siloxane-based resin, polyimide-based resin, polyamide-based resin, or perylene-based resin.

The sensor cover layer 205 may be disposed on the sensor insulating layer 203 and may cover the second sensor conductive layer 204. The second sensor conductive layer 204 may include a conductive pattern. The sensor cover layer 205 covers the conductive pattern and may reduce or eliminate the probability of damage to the conductive pattern in a subsequent process. The sensor cover layer 205 may include an inorganic material. For example, the sensor cover layer 205 may include, for example, silicon nitride ($Si_3N_4$), but the present disclosure is not limited thereto. According to an embodiment of the present disclosure, the sensor cover layer 205 may be omitted.

The anti-reflection layer 300 may be disposed on the sensor 200. The anti-reflection layer 300 may include a division layer 310, a plurality of color filters 320, and a planarization layer 330.

The division layer 310 may be disposed to overlap a conductive pattern of the second sensor conductive layer 204. The sensor cover layer 205 may be disposed between the division layer 310 and the second sensor conductive layer 204. The division layer 310 may prevent reflection of the external light due to the second sensor conductive layer 204. A material forming the division layer 310 is not particularly limited as long as it is a material that absorbs a light. The division layer 310 may be a layer having a black color, and in an embodiment of the present disclosure, the division layer 310 may include a black coloring agent. The black coloring agent may include a black dye and/or a black pigment. The black coloring agent may include carbon black, or metal such as chrome or an oxide thereof.

A division opening 310op may be defined in the division layer 310. The division opening 310op may overlap the emission layer EL. The color filter 320 may be disposed to correspond to the division opening 310op. The color filter 320 may transmit light provided from the emission layer EL overlapping the color filter 320. In an embodiment of the present disclosure, the electronic device 1000 may include a plurality of color filters 320 having a predetermined arrangement. The arrangement of the color filters 320 may be determined by taking into account emission colors of pixels PX included in the display layer 100. Thus, the desired color may be realized by filtering the light emitted by each of the pixels PX with the color filter 320.

The planarization layer 330 may cover the division layer 310 and the color filter 320. The planarization layer 330 may include an organic material and may provide a flat surface on an upper surface of the planarization layer 330. In an embodiment of the present disclosure, the planarization layer 330 may be omitted.

In an embodiment of the present disclosure, the anti-reflection layer 300 may include a reflection control layer instead of the color filters 320. For example, in the illustration of FIG. 4, the color filter 320 may be omitted, and a reflection control layer may be added in the place where the color filter 320 is omitted. The reflection control layer may selectively absorb light in a partial band among light reflected from inside the display layer 100 and/or electronic device or light incident from the outside of the display layer 100 and/or electronic device.

As the reflection control layer absorbs a first wavelength range of 490 nm to 505 nm and a second wavelength range of 585 nm to 600 nm, the reflection control layer may have a light transmittance of 40% or less in the first wavelength range and the second wavelength range. The reflection control layer may absorb light having a wavelength out of the wavelength range of red, green, and blue light emitted from the emission layer EL. In this way, the reflection control layer absorbs light having a wavelength that does not belong to the red, green, or blue wavelength range emitted from the emission layer EL, thereby preventing or minimizing the decrease in luminance of the display layer 100 and/or the electronic device. In addition, at the same time, deterioration in emission efficiency of the display layer 100 and/or electronic device may be prevented or minimized, and visibility may be enhanced.

The reflection control layer may be provided with an organic material layer including a dye, a pigment, or a combination thereof. The reflection control layer may include, for example, a tetraazaporphyrin (TAP)-based compound, a porphyrin-based compound, a metal porphyrin-based compound, an oxazine-based compound, a squarylium-based compound, a triarylmethane-based compound, a polymethine-based compound, a traquinone-based compound, a phthalocyanine-based compound, an azo-based compound, a perylene-based compound, a xanthene-based compound, a diimmonium-based compound, a dipyrromethene-based compound, a cyanine-based compound, or a combination thereof.

In an embodiment of the present disclosure, the reflection control layer may have a transmittance of about 64% to about 72%. The transmittance of the reflection control layer may be adjusted according to the amount of pigment and/or dye included in the reflection control layer.

In an embodiment of the present disclosure, the anti-reflection layer 300 may include a phase retarder and/or a polarizer. The phase retarder may be a film type retarder or a liquid crystal coating type retarder and may include a $\lambda/2$ retarder and/or a $\lambda/4$ retarder. The polarizer may also be a film type polarizer or a liquid crystal coating type polarizer. The anti-reflection layer 300 may include at least a polarizing film. In this case, the anti-reflection layer 300 may be attached to the sensor 200 through an adhesive layer.

Figure 5:
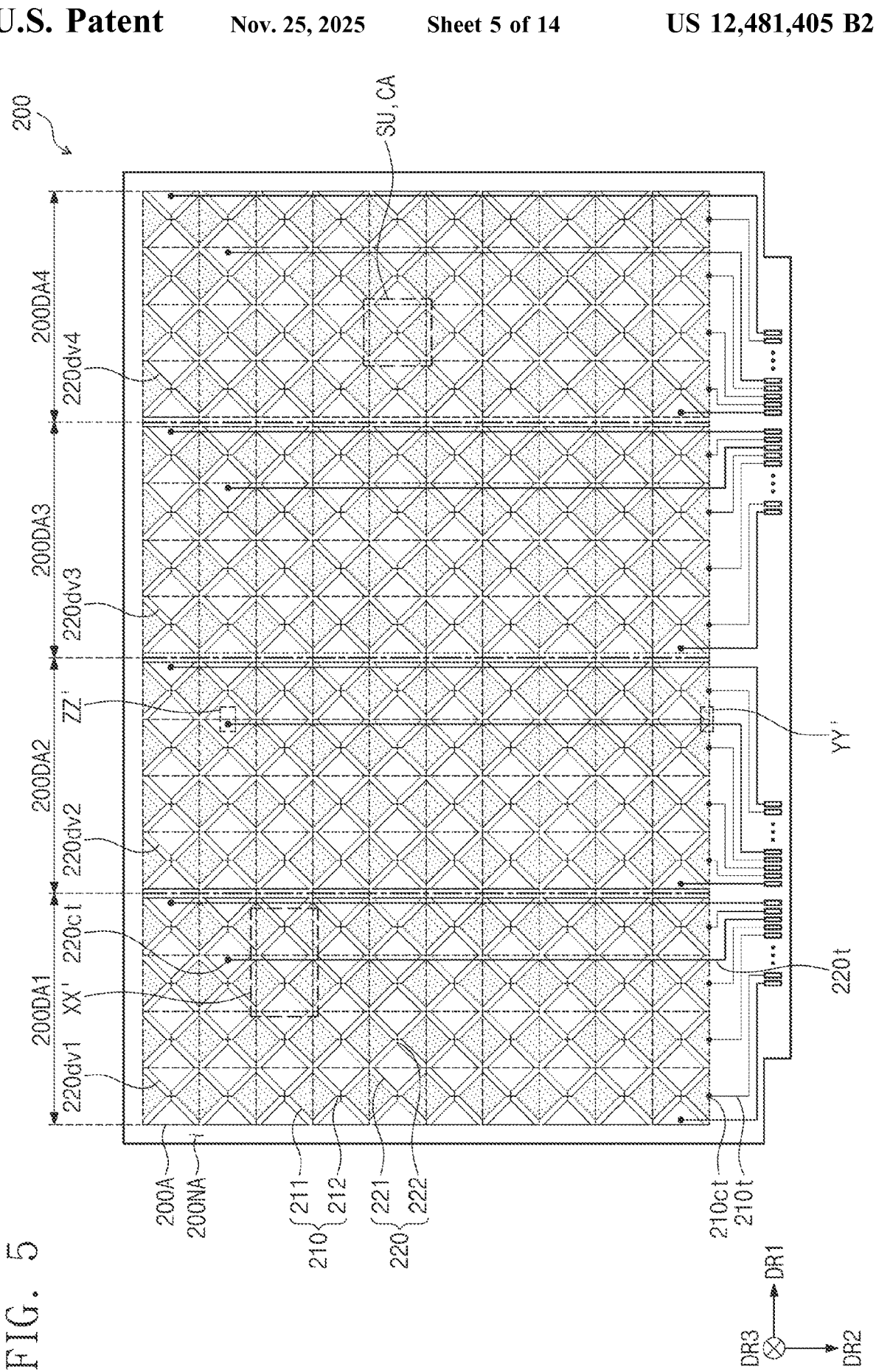
FIG. 5 is a plan view of a sensor, according to an embodiment of the present disclosure.

FIG. 5 is a plan view of the sensor 200 according to an embodiment of the present disclosure.

Referring to FIG. 5, a sensing area 200A and a peripheral area 200NA adjacent to the sensing area 200A may be defined in the sensor 200.

The sensor 200 may include a plurality of first sensing electrodes 210 and a plurality of second sensing electrodes 220, which are disposed in the sensing area 200A. The first sensing electrodes 210 may be arranged in the first direction DR1, and the second sensing electrodes 220 may be arranged in the second direction DR2 intersecting the first direction DR1. Each of the first sensing electrodes 210 may extend in the second direction DR2, and may intersect the second sensing electrodes 220. Each of the second sensing electrodes 220 may extend in the first direction DR1, and may intersect the first sensing electrodes 210.

Although FIG. 5 illustrates 16 first sensing electrodes 210 and 10 second sensing electrodes 220 as an example, the number of each of the first sensing electrodes 210 and the second sensing electrodes 220 is not limited thereto. For example, the number of first sensing electrodes 210 and the number of second sensing electrodes 220 may be variously changed according to the aspect ratio of the electronic device 1000 (refer to FIG. 1). Also, although the number of the first sensing electrodes 210 is shown to be larger than the number of the second sensing electrodes 220, but the present disclosure is not limited thereto. For example, the number of the first sensing electrodes 210 may be smaller than the number of the second sensing electrodes 220. Each of the first sensing electrodes 210 may include a first portion 211 and a second portion 212. The first portion 211 and the second portion 212 may have an integrated shape with each other and may be disposed on the same layer. Each of the second sensing electrodes 220 may include a sensing pattern 221 and a bridge pattern 222. The two sensing patterns 221 adjacent to each other may be electrically connected to each other by the two bridge patterns 222, but the present disclosure is not limited thereto. The first portion 211 may be referred to as a sensing portion, and the second portion 212 may be referred to as a connection portion. Alternatively, the first portion 211 may be referred to as a first sensing pattern, the second portion 212 may be referred to as a first bridge pattern, the sensing pattern 221 may be referred to as a second sensing pattern, and the bridge pattern 222 may be referred to as a second bridge pattern. In an embodiment of the present disclosure, all of the first portions 211 and the sensing patterns 221 except the first and last ones in the extension direction may have a diamond shape, and each of the first and last ones in the extension direction may have a triangle shape obtained by cutting the diamond shape. It is, however, to be understood that the present disclosure is not limited thereto.

The sensor 200 may include a plurality of first trace lines 210t electrically connected to the first sensing electrodes 210, respectively, and may include a plurality of second trace lines 220t electrically connected to the second sensing electrodes 220, respectively. The first sensing electrodes 210 and the first trace lines 210t may be respectively connected through a plurality of first contacts 210ct. The second sensing electrodes 220 and the second trace lines 220t may be respectively connected through a plurality of second contacts 220ct. In an embodiment of the present disclosure, the first contacts 210ct may overlap the peripheral area 200NA, and the second contacts 220ct may overlap the sensing area 200A. However, the present disclosure is not limited thereto. For example, in an embodiment of the present disclosure, both the first contacts 210ct and the second contacts 220ct may overlap the sensing area 200A.

In an embodiment of the present disclosure, the second trace lines 220t may extend to overlap the sensing area 200A. For example, the second trace lines 220t may not be disposed in the peripheral area 200NA adjacent to the sensing area 200A in the first direction DR1. For example, the second trace lines 220t may extend in the second direction DR2 within the sensing area 200A to be respectively connected to the corresponding second sensing electrodes 220 arranged in the second direction DR2. Accordingly, an area of the peripheral area 200NA may be reduced. As a result, the area occupied by a non-display area NDA (refer to FIG. 1) on the display surface of the electronic device 1000 (refer to FIG. 1) may be reduced, and a narrow bezel may be implemented.

In addition, in an embodiment of the present disclosure, since the length of the second sensing electrodes 220 is increased by the aspect ratio of the electronic device 1000-1 (refer to FIG. 2), the load of the second sensing electrodes 220 may be increased. In this case, each of the second sensing electrodes 220 may be divided into a plurality of division electrodes 220dv1, 220dv2, 220dv3, and 220dv4 to reduce the load of the second sensing electrodes 220. For example, when each of the second sensing electrodes 220 is divided into three or more, the division electrodes 220dv2 and 220dv3 spaced apart from the peripheral area 200NA may be electrically connected to the trace lines 220t extending to overlap the sensing area 200A.

The sensing area 200A may be divided into a plurality of division driving areas 200DA1, 200DA2, 200DA3, and 200DA4 respectively corresponding to the plurality of division electrodes 220dv1, 220dv2, 220dv3, and 220dv4. In this case, one row of division electrodes 220dv1, 220dv2, 220dv3, and 220dv4 aligned in the first direction DR1 may be simultaneously sensed.

In an embodiment of the present disclosure, the sensor 200 may be divided into a plurality of sensing units SU. Each of the sensing units SU may include an intersection area CA in which a corresponding one of the first sensing electrodes 210 intersects a corresponding one of the second sensing electrodes 220. For example, although FIG. 5 illustrates that the sensor 200 includes 160 sensing units SU and 160 intersection areas CA corresponding thereto, as an example, the number of sensing units SU and the number of intersection areas CA may be changed according to the number of first sensing electrodes 210 and the number of second sensing electrodes 220.

FIG. 6A is a plan view illustrating the first sensor conductive layer 202 corresponding to an area XX' illustrated in FIG. 5. FIG. 6B is a plan view illustrating the second sensor conductive layer 204 corresponding to an area XX' illustrated in FIG. 5. FIG. 7 is an enlarged plan view of an area XX' illustrated in FIG. 5.

In FIGS. 5, 6A, and 6B, the first portion 211 and the second portion 212 are disposed on a layer the same as that of the sensing pattern 221, and the bridge patterns 222 may be disposed on a layer different from that of the first portion 211, the second portion 212, and the sensing pattern 221. The sensing pattern 221, the first portion 211, and the second portion 212 may include a plurality of mesh lines MSL1 and MSL2 extending in the first and second directions DR1 and DR2. Since each of the first sensing electrodes 210 includes the first portion 211 and the second portion 212, and each of the second sensing electrodes 220 includes the sensing pattern 221, each of the first sensing electrodes 210 and the second sensing electrodes 220 may include a plurality of mesh lines MSL1 and MSL2 extending in the first and second directions DR1 and DR2. The two bridge patterns 222 may insulate and intersect the second portion 212.

In an embodiment of the present disclosure, the bridge patterns 222 are included in the first sensor conductive layer 202, and the first portion 211, the second portion 212, and the sensing pattern 221 may be included in the second sensor conductive layer 204. However, the present disclosure is not limited thereto. For example, the bridge patterns 222 are included in the second sensor conductive layer 204, and the first portion 211, the second portion 212, and the sensing pattern 221 may be included in the first sensor conductive layer 202.

In an embodiment of the present disclosure, the first sensor conductive layer 202 may further include a plurality of dummy electrodes DMP. Each of the dummy electrodes DMP may be electrically floated. The dummy electrodes DMP may be provided in various sizes and shapes. The size of the largest dummy electrode among the dummy electrodes DMP may be limited to be less than a predetermined size. For example, each of the dummy electrodes DMP may resemble a break up piece of mesh lines, and may include a disconnected line extending in the first direction DR1, a disconnected line extending in the second direction, or a disconnected structure including at least a line extending in the first direction DR1 and at least a line extending in the second direction DR2 connected thereof. The dummy electrodes DMP will be more fully detailed later.

Each of the second trace lines 220t may include a plurality of sub-lines 220ta. According to an embodiment of the present disclosure, resistance of one second trace line 220t may be reduced as one second trace line 220*t* includes two or more sub-lines 220*ta*. In FIG. 6A, although one second trace line 220*t* includes four sub-lines 220*ta* as an example, but the present disclosure is not limited thereto.

The sub-lines 220*ta* overlap the sensing area 200A, and may be spaced apart from each other. For example, the sub-lines 220*ta* may have a perfectly straight shape in a portion passing through the sensing area 200A, and may be spaced apart from each other without being connected to each other. For example, each of the sub-lines 220*ta* may include only a line extending in the second direction DR2. For example, each of the sub-lines 220*ta* may have a straight line shape. Accordingly, as the area of each of the sub-lines 220*ta* is minimized, a base capacitance caused by the sub-lines 220*ta* may be reduced.

The base capacitance is a parasitic capacitance component and may affect the bandwidth of a transmission signal provided to a sensor 200. When the base capacitance is reduced, the overall load of the sensor 200 may be reduced and the bandwidth may be widened. In this case, as the selection range of selectable frequencies is widened, it may be easier to avoid noise. For example, it may enhance the touch sensitivity of the sensor 200.

Referring to FIGS. 6A and 7, the sub-lines 220*ta* are disposed on a layer the same as that of the bridge patterns 222, and the sub-lines 220*ta* may not overlap the first sensing electrodes 210. Since the bridge patterns 222 may be disposed on a layer different from that of the first portions 211, the second portions 212, and the sensing patterns 221, the sensing patterns 221 and the first sensing electrodes 210 may be disposed on a layer different from that of the sub-lines 220*ta*. The sub-lines 220*ta* may overlap the second sensing electrodes 220, for example, the sensing pattern 221. Accordingly, the influence of signal interference or parasitic capacitance between the first sensing electrodes 210 and the sub-lines 220*ta* may be minimized.

The shape of each of the first sensing electrodes 210 and the second sensing electrodes 220 illustrated in FIG. 5 is not limited thereto. For example, each of the first sensing electrodes 210 and the second sensing electrodes 220 may include a plurality of sub-electrodes connected to the same trace line such that a space in which the sub-lines 220*ta* do not overlap with the first sensing electrodes 210 may be secured. For example, when each of the first sensing electrodes 210 and the second sensing electrodes 220 includes three sub-electrodes, one sensing unit SU may have a shape similar to that of the 3×3 sensing units SU illustrated in FIG. 5.

Figure 8:
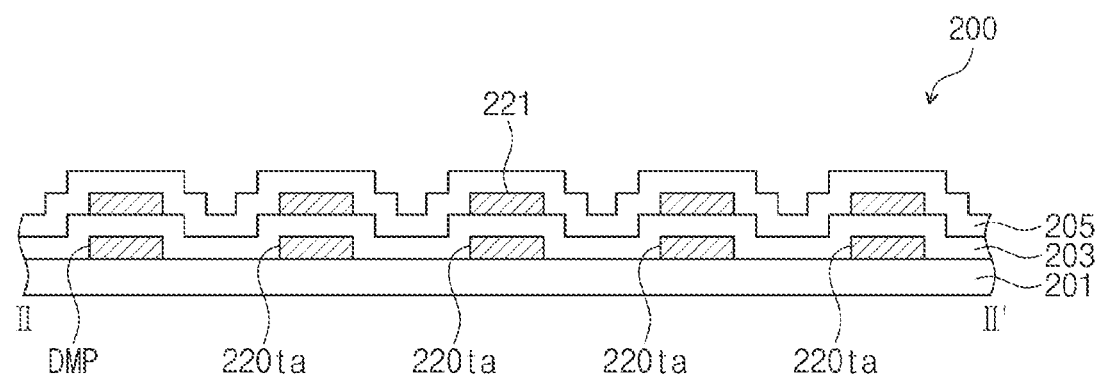
FIG. 8 is a cross-sectional view of a sensor, according to an embodiment of the present disclosure taken along line II-II' of FIG. 7.

FIG. 8 is a cross-sectional view of a sensor, according to an embodiment of the present disclosure. FIG. 8 may be a cross-sectional view taken along line II-II' of FIG. 7.

Referring to FIGS. 7 and 8, the dummy electrodes DMP are disposed in an area in which the bridge patterns 222 and the sub-lines 220*ta* are not disposed. Accordingly, the level difference of the sensor insulating layer 203 may be formed at a similar level in all areas. Therefore, a visibility problem caused by the level difference of the sensor insulating layer 203 being concentrated in a specific area may be solved. The dummy electrodes DMP and the sub-lines 220*ta* may be disposed between the sensor base layer 201 and the sensor insulating layer 203. For example, the first sensor conductive layer 202 interposed between the sensor base layer 201 and the sensor insulating layer 203 may include at least the dummy electrodes DMP and the sub-lines 220*ta*. In other words, the dummy electrodes DMP may be disposed on a layer the same as that of the plurality of sub-lines 220*ta*.

Figure 9A:
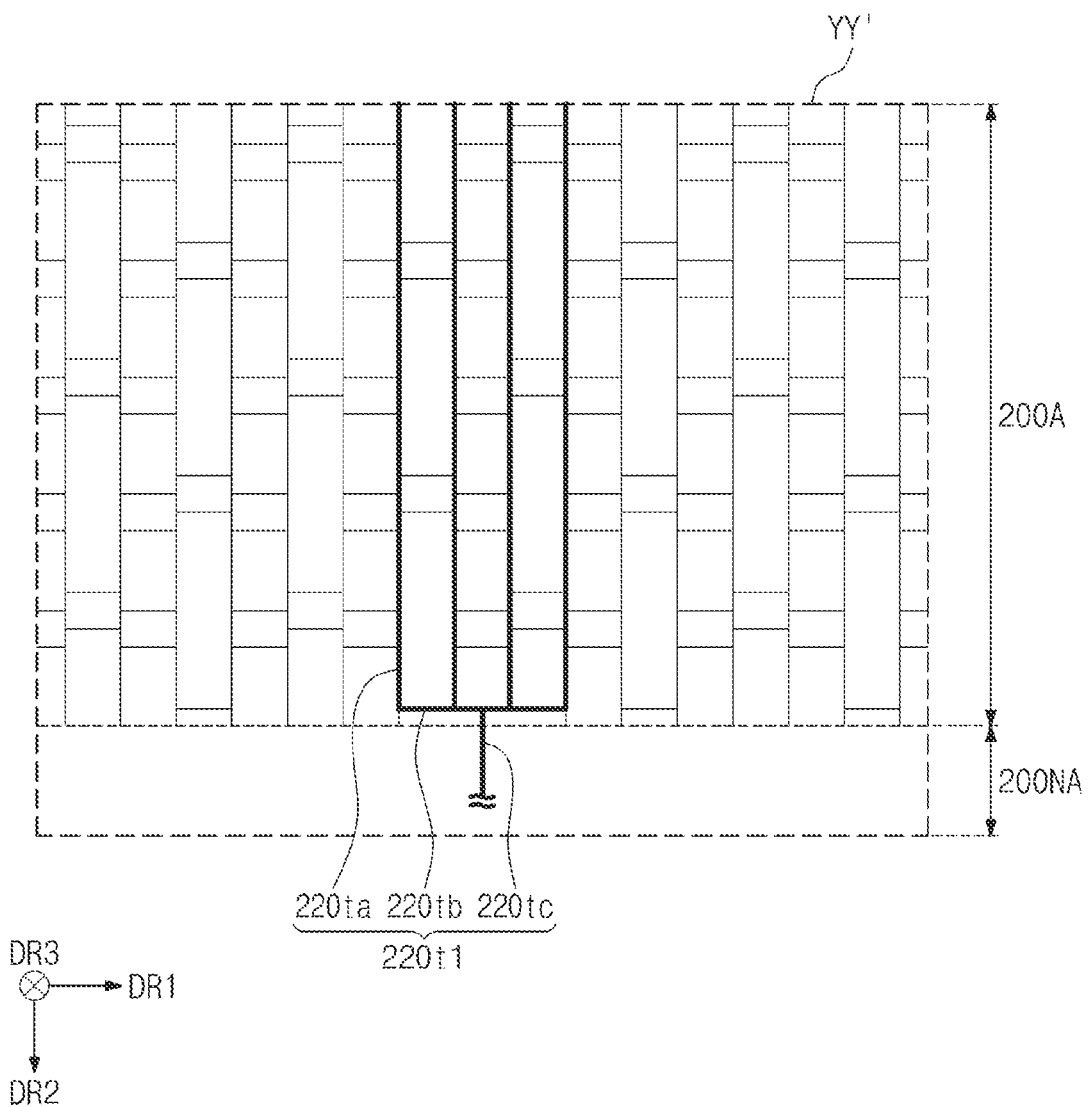
FIG. 9A is a plan view according to an embodiment of the present disclosure illustrating an enlarged area YY' illustrated in FIG. 5.

FIG. 9A is a plan view according to an embodiment of the present disclosure illustrating an enlarged area YY' illustrated in FIG. 5.

Referring to FIGS. 5 and 9A, one second trace line 220*tl* among the plurality of second trace lines 220*t* is representatively illustrated. The one second trace line 220*tl* may include the plurality of sub-lines 220*ta*, a connection line 220*tb*, and a common line 220*tc*.

As the one second trace line 220*tl* includes two or more sub-lines 220*ta*, resistance of the one second trace line 220*tl* may be reduced. One end of each of the sub-lines 220*ta* may be electrically connected by the connection line 220*tb*. The sub-lines 220*ta* may have a perfectly straight shape and may be electrically connected to each other through the connection line 220*tb*. For example, the sub-lines 220*ta* may each include a straight line extending in the second direction DR2, and may be spaced apart from each other in the first direction DR1. The connection line 220*tb* may extend in the first direction DR1 to connect the sub-lines 220*ta* extending in the second direction DR2.

In an embodiment of the present disclosure, the connection line 220*tb* may be disposed in the sensing area 200A. The connection line 220*tb* may be disposed on a layer the same as that of the sub-lines 220*ta* or may be disposed on a layer different from that of the sub-lines 220*ta*. In detail, the connection line 220*tb* may be included in the first sensor conductive layer 202 (refer to FIG. 4) or the second sensor conductive layer 204 (refer to FIG. 4).

The connection line 220*tb* may be electrically connected to a pad through the common line 220*tc*. The common line 220*tc* may be disposed in the peripheral area 200NA. The common line 220*tc* may have a single-layered structure or a multi-layered structure. For example, when the common line 220*tc* has a single-layered structure, the common line 220*tc* may be included in the first sensor conductive layer 202 or the second sensor conductive layer 204. When the common line 220*tc* has a multi-layered structure, the common line 220*tc* is included in a first layer line included in the first sensor conductive layer 202 and the second sensor conductive layer 204, and may include a second layer line electrically connected with the first layer line. In other words, when the common line 220*tc* has a multi-layered structure, the common line 220*tc* may be included in both the first sensor conductive layer 202 and the second sensor conductive layer 204.

Figure 9B:
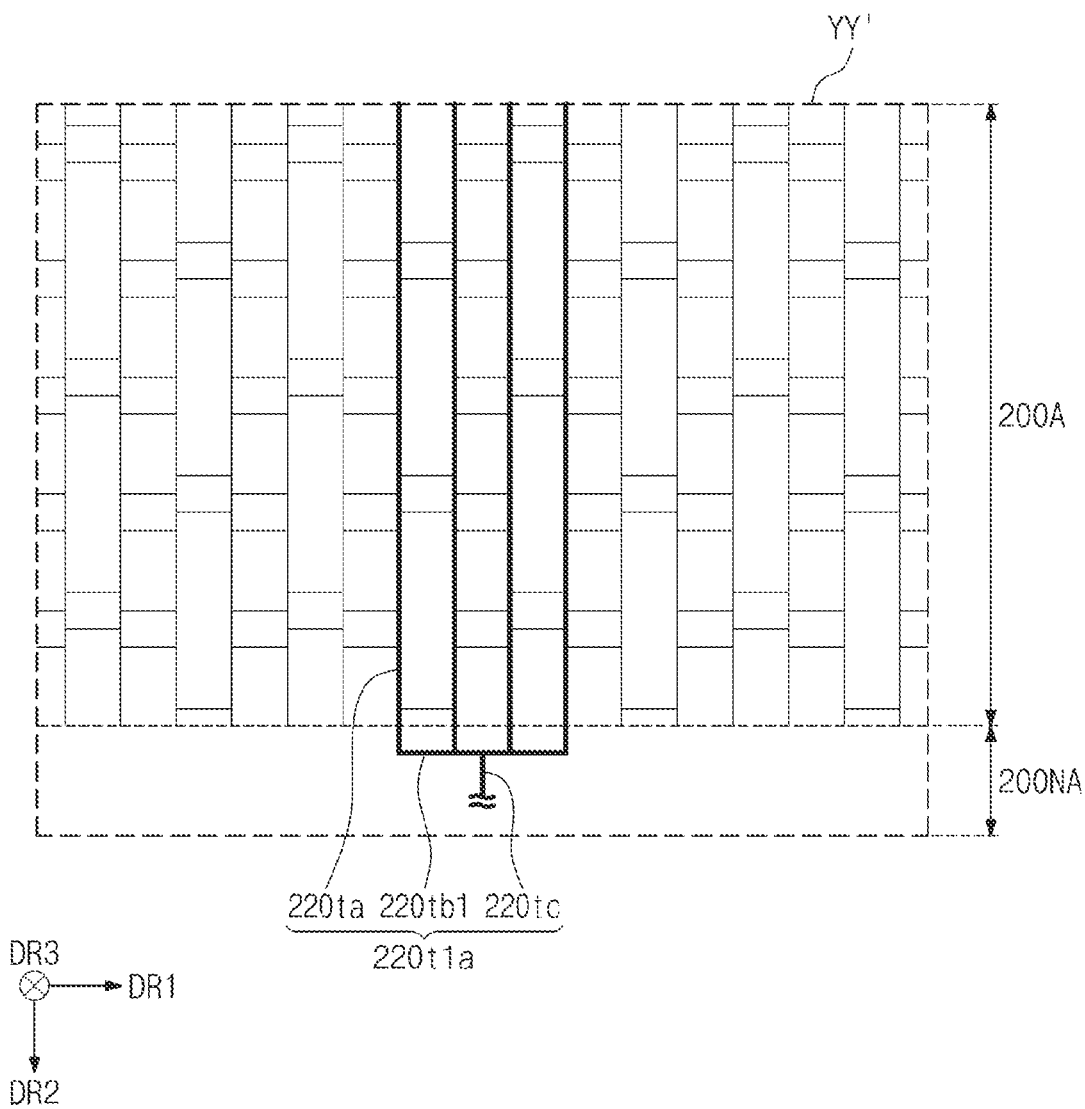
FIG. 9B is a plan view according to an embodiment of the present disclosure illustrating an enlarged area YY' illustrated in FIG. 5.

FIG. 9B is a plan view according to an embodiment of the present disclosure illustrating an enlarged area YY' illustrated in FIG. 5. In the description of FIG. 9B, the same reference numerals are assigned to the same components described with reference to FIG. 9A, and thus the descriptions thereof are omitted to avoid redundancy.

In an embodiment of the present disclosure, the connection line 220*tb*1 may be disposed in the peripheral area 200NA. The connection line 220*tb*1 may be disposed on a layer the same as that of the sub-lines 220*ta* or may be disposed on a layer different from that of the sub-lines 220*ta*. In detail, the connection line 220*tb*1 may be included in the first sensor conductive layer 202 (refer to FIG. 4) or the second sensor conductive layer 204 (refer to FIG. 4).

Figure 10:
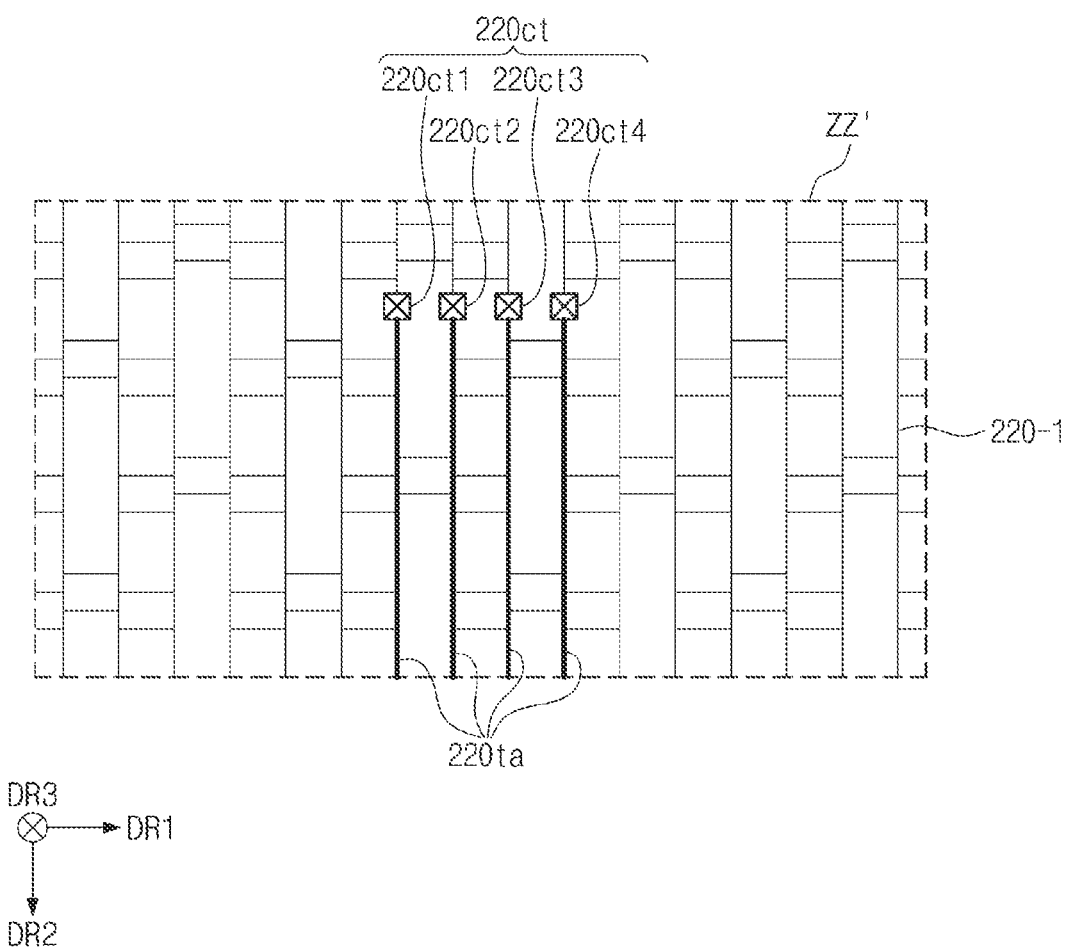
FIG. 10 is a plan view according to an embodiment of the present disclosure illustrating an enlarged area ZZ' illustrated in FIG. 5.

FIG. 10 is a plan view according to an embodiment of the present disclosure illustrating an enlarged area ZZ' illustrated in FIG. 5.

Referring to FIGS. 5, 9A, and 10, the sub-lines 220*ta* included in one second trace line 220*tl* may be electrically connected to one second sensing electrode 220-1 of the second sensing electrodes 220.

Each of the sub-lines 220*ta* may be only connected at one end by the connection line 220*tb*, and may be spaced apart from each other in the remaining area. Accordingly, each of the second contacts 220*ct* may include a plurality of sub-contacts 220*ct*1, 220*ct*2, 220*ct*3, and 220*ct*4. The sub-lines 220*ta* may be electrically connected to the one second sensing electrode 220-1 through the plurality of sub-contacts 220*ct*1, 220*ct*2, 220*ct*3, and 220*ct*4. Accordingly, the sub-lines 220*ta* may be connected to each other only at one ends spaced apart from the plurality of sub-contacts 220*ct*1, 220*ct*2, 220*ct*3, and 220*ct*4.

In FIG. 10, the number of sub-contacts 220*ct*1, 220*ct*2, 220*ct*3, and 220*ct*4 corresponding to the number of sub-lines 220*ta* is illustrated as an example, but the present disclosure is not limited thereto. For example, at least one sub-line among the sub-lines 220*ta* may be connected to the one second sensing electrode 220-1 through a plurality of sub-contacts.

Figure 11:
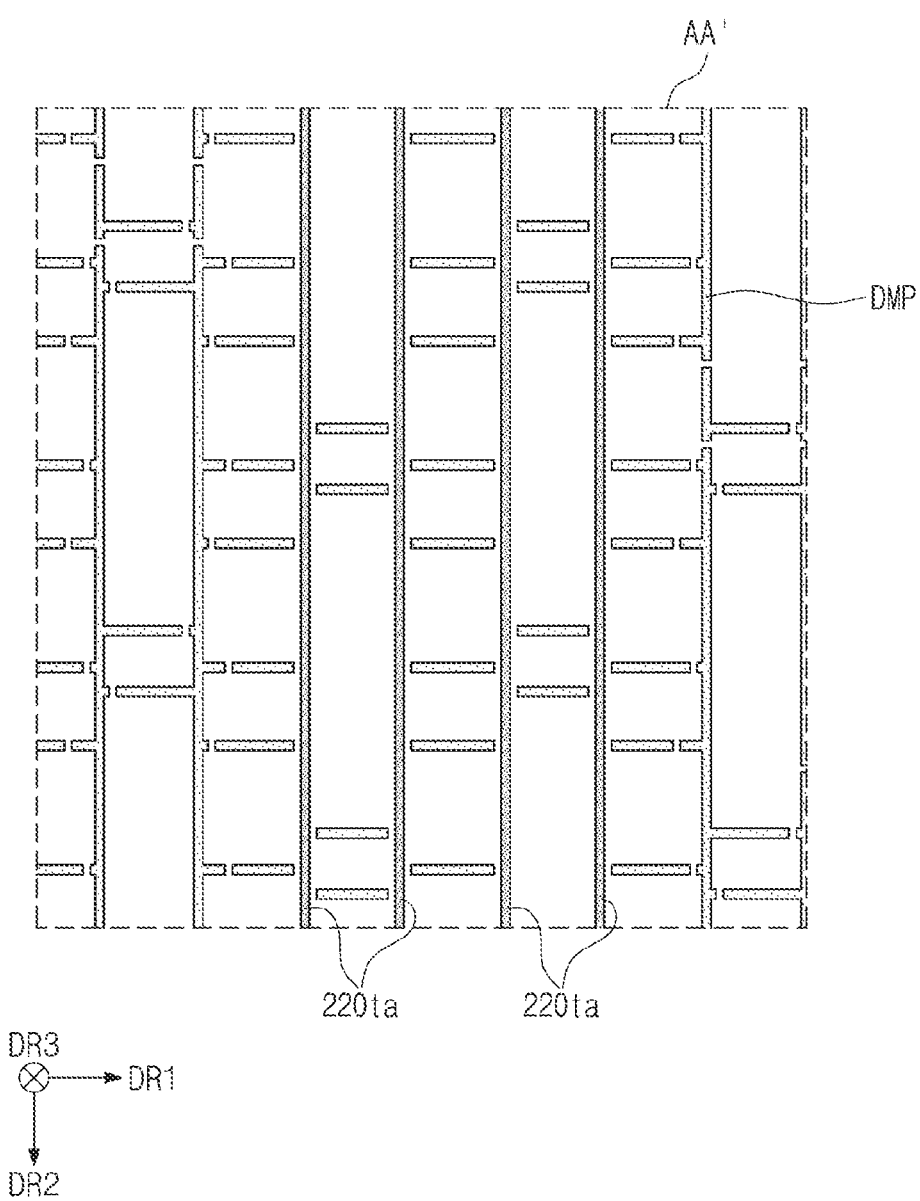
FIG. 11 is an enlarged plan view of an area AA' illustrated in FIG. 6A.

FIG. 11 is an enlarged plan view of an area AA' illustrated in FIG. 6A.

Referring to FIG. 11, a portion of each of the plurality of sub-lines 220*ta* and the plurality of dummy electrodes DMP are illustrated as an example. The sub-lines 220*ta* may have a perfectly straight shape. Therefore, mesh lines adjacent to the sub-lines 220*ta* may be dummy electrodes DMP spaced apart from the sub-lines 220*ta*. For example, the sub-lines 220*ta* may not be connected to the dummy electrodes DMP.

As each of the sub-lines 220*ta* includes only a line extending along the second direction DR2, the area of each of the sub-lines 220*ta* may be minimized. Accordingly, the parasitic capacitance component caused by the sub-lines 220*ta* is reduced, the overall load of the sensor 200 is reduced, and the bandwidth of the sensor 200 may be widened. As a result, the selection range of selectable frequencies necessary for the operation of the sensor 200 is widened, it may be easier to avoid noise. For example, it may enhance the touch sensitivity of the sensor 200.

Figure 12:
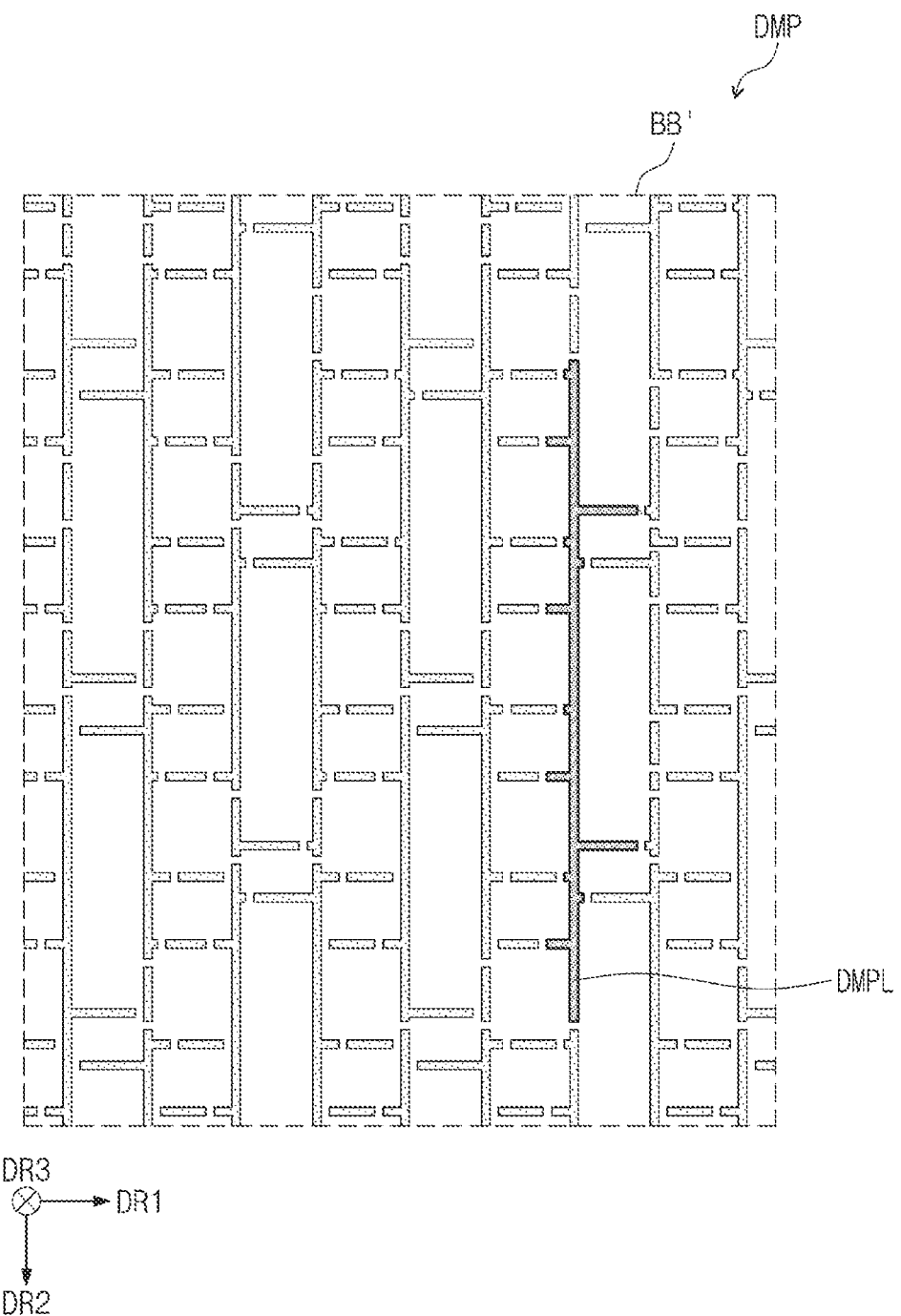
FIG. 12 is an enlarged plan view of an area BB' illustrated in FIG. 6A.

FIG. 12 is an enlarged plan view of an area BB' illustrated in FIG. 6A.

Referring to FIGS. 5, 6A, and 12, the sensor 200 may be divided into the plurality of sensing units SU. Each of the sensing units SU may include an intersection area CA in which a corresponding one of the first sensing electrodes 210 intersects a corresponding one of the second sensing electrodes 220.

The maximum area of one dummy electrode DMPL having the largest size among the plurality of dummy electrodes DMP may be about 0.02% or less and greater than 0% of the total area of the dummy electrodes overlapping the intersection area CA among the dummy electrodes DMP. Accordingly, the condition that the area of the individual dummy electrodes is about 0.02% or less of the total area of the dummy electrodes overlapping the intersection area CA may be satisfied.

In this case, the amount of decrease in capacitance change between the first sensing electrode 210 and the second sensing electrode 220 may be less than the amount of decrease in capacitance between the first sensing electrode 210 and the second sensing electrode 220. For example, compared to a reference sensor in which the area design of dummy electrodes is not reflected by random cutting, the capacitance between the first sensing electrode 210 and the second sensing electrode 220 may be about 80%, and the amount of in capacitance change between the first sensing electrode 210 and the second sensing electrode 220 may be about 95%. That is, the signal-to-noise ratio of the sensor 200 may increase and the sensitivity of the sensor 200 may be enhanced.

According to an embodiment of the present disclosure, a trace line of a sensor may include a plurality of sub-lines. As one trace line includes two or more sub-lines, resistance of the trace line may be reduced. The sub-lines may overlap the sensing area of the sensor and may be spaced apart from each other. For example, the sub-lines may have a completely straight shape in a portion passing through the sensing area, and may be spaced apart from each other without being connected to each other. Accordingly, as the area of each of the sub-lines is minimized, the base capacitance caused by the sub-lines may be reduced. The base capacitance may be a parasitic capacitance component that can affect the bandwidth of a transmission signal provided to a sensor. When the base capacitance is reduced, the overall load of the sensor may be reduced and the bandwidth can be widened. In this case, as the selection range of selectable frequencies is widened, it may be easier to avoid noise. That is, it may be good for enhancing a touch sensitivity of the sensor.

In addition, the sensor may include a plurality of dummy electrodes. A maximum area of one dummy electrode having the largest size among the plurality of dummy electrodes may be about 0.02% or less of a total area of dummy electrodes overlapping an intersection area among the dummy electrodes. In this case, the amount of decrease in capacitance change between the first sensing electrode and the second sensing electrode may be less than the amount of decrease in capacitance between the first sensing electrode and the second sensing electrode. That is, the signal-to-noise ratio of the sensor may increase and the sensitivity of the sensor may be enhanced.

Although embodiments of the present disclosure have been described for illustrative purposes, those skilled in the art will appreciate that various modifications, and substitutions are possible, without departing from the scope and spirit of the present disclosure as disclosed in the appended claims.

The invention claimed is:

1. An electronic device comprising:
   a sensor in which a sensing area and a peripheral area adjacent to the sensing area are defined,
   wherein the sensor includes:
      a plurality of first sensing electrodes arranged in a first direction;
      a plurality of second sensing electrodes arranged in a second direction intersecting the first direction;
      a plurality of first trace lines electrically connected to the plurality of first sensing electrodes, respectively; and
      a plurality of second trace lines electrically connected to the plurality of second sensing electrodes, respectively,
   wherein each of the plurality of second trace lines includes a plurality of sub-lines overlapping the sensing area,
   wherein each of the plurality of sub-lines has a straight line shape and extends in the second direction,
   wherein the plurality of sub-lines are spaced apart from one another, and
   wherein the plurality of sub-lines are connected to each other only once, at one end.

2. The electronic device of claim 1, wherein the plurality of sub-lines are connected to one of the plurality of second sensing electrodes through a plurality of contacts, respectively, and the plurality of contacts overlap the sensing area.

3. The electronic device of claim 1, wherein each of the plurality of second trace lines further includes a connection line connecting the plurality of sub-lines.

4. The electronic device of claim 3, wherein the connection line overlaps the sensing area.

5. The electronic device of claim 3, wherein the connection line overlaps the peripheral area.

6. The electronic device of claim 1, wherein each of the plurality of second trace lines further includes a common line connected to the plurality of sub-lines and disposed in the peripheral area.

7. The electronic device of claim 1, wherein each of the plurality of second sensing electrodes further includes a plurality of sensing patterns and a plurality of bridge patterns electrically connecting the plurality of sensing patterns, and the plurality of bridge patterns and the plurality of sub-lines are disposed on a same layer.

8. The electronic device of claim 7, wherein the plurality of sensing patterns and the plurality of first sensing electrodes are disposed on a layer different from that of the plurality of sub-lines.

9. The electronic device of claim 7, wherein the sensor further includes a plurality of dummy electrodes disposed on a layer the same as that of the plurality of sub-lines, and
wherein the plurality of dummy electrodes are electrically floated.

10. The electronic device of claim 9, wherein the sensor is divided into a plurality of sensing units, and each of the plurality of sensing units includes an intersection area in which a corresponding first sensing electrode among the plurality of first sensing electrodes and a corresponding second sensing electrode among the plurality of second sensing electrodes intersect, and
wherein a maximum area of one dummy electrode among the plurality of dummy electrodes is about 0.02% or less of a total area of dummy electrodes overlapping the intersection area among the plurality of dummy electrodes.

11. The electronic device of claim 1, wherein each of the plurality of first sensing electrodes and the plurality of second sensing electrodes includes a plurality of mesh lines extending in the first direction and the second direction, and
wherein each of the plurality of sub-lines includes only a line extending in the second direction.

12. An electronic device comprising:
a plurality of first sensing electrodes arranged in a first direction;
a plurality of second sensing electrodes arranged in a second direction intersecting the first direction; and
a plurality of trace lines electrically connected to the plurality of second sensing electrodes, respectively,
wherein each of the plurality of trace lines includes a plurality of sub-lines,
wherein each of the plurality of sub-lines has the form of a straight line extending in the second direction, and
wherein the plurality of sub-lines are connected to each other only once, at one end.

13. The electronic device of claim 12, wherein the plurality of sub-lines are connected to one of the plurality of second sensing electrodes respectively through a plurality of contacts overlapping the one of the plurality of second sensing electrodes.

14. The electronic device of claim 12, wherein each of the plurality of trace lines further includes a connection line connecting the plurality of sub-lines and a common line connected to the connection line.

15. The electronic device of claim 12, wherein each of the plurality of second sensing electrodes further includes a plurality of sensing patterns and a plurality of bridge patterns electrically connecting the plurality of sensing patterns, the plurality of bridge patterns and the plurality of sub-lines are disposed on a same layer, and the plurality of sensing patterns and the plurality of first sensing electrodes are disposed on a layer different from that of the plurality of sub-lines.

16. The electronic device of claim 15, further comprising:
a plurality of dummy electrodes disposed on a layer the same as that of the plurality of sub-lines and electrically floated,
wherein an intersection area in which one of the plurality of first sensing electrodes and one of the plurality of second sensing electrodes intersect is defined, and a maximum area of one dummy electrode among the plurality of dummy electrodes is about 0.02% or less of a total area of dummy electrodes overlapping the intersection area among the plurality of dummy electrodes.

17. The electronic device of claim 12, wherein each of the plurality of first sensing electrodes and the plurality of second sensing electrodes includes a plurality of mesh lines extending in the first direction and the second direction.

18. An electronic device comprising:
a plurality of first sensing electrodes arranged in a first direction;
a plurality of second sensing electrodes arranged in a second direction intersecting the first direction; and
a plurality of sub-lines extending in the second direction and connected to one of the plurality of second sensing electrodes through a plurality of contacts, respectively, with each of the plurality of sub-lines having a straight line shape,
wherein the plurality of contacts overlap the one of the plurality of second sensing electrodes, and
wherein the plurality of sub-lines are connected to each other only once, at one end, spaced apart from the plurality of contacts.

* * * * *